United States Patent
Glazier et al.

(10) Patent No.: US 11,582,983 B2
(45) Date of Patent: *Feb. 21, 2023

(54) HEAT RESISTANT CHOCOLATE

(71) Applicant: MARS, INCORPORATED, McLean, VA (US)

(72) Inventors: Barry David Glazier, Elizabethtown, PA (US); Karyn Wild, Elizabethtown, PA (US); Joanna Wentzel, Elizabethtown, PA (US); Mary Myers, Elizabethtown, PA (US); Marilyn Hess, Elizabethtown, PA (US); Shirley Lease, Elizabethtown, PA (US); David Hausman, Elizabethtown, PA (US); Robert M. Friedman, Hackettstown, NJ (US); Connie Williams, Hackettstown, NJ (US); Colleen Kramer, Hackettstown, NJ (US)

(73) Assignee: MARS, INCORPORATED, McLean, VA (US)

(*) Notice: Subject to any disclaimer, the term of this patent is extended or adjusted under 35 U.S.C. 154(b) by 52 days.

This patent is subject to a terminal disclaimer.

(21) Appl. No.: 14/432,108

(22) PCT Filed: Sep. 25, 2013

(86) PCT No.: PCT/US2013/061645
§ 371 (c)(1),
(2) Date: Mar. 27, 2015

(87) PCT Pub. No.: WO2014/052430
PCT Pub. Date: Apr. 3, 2014

(65) Prior Publication Data
US 2015/0251844 A1    Sep. 10, 2015

Related U.S. Application Data

(60) Provisional application No. 61/789,863, filed on Mar. 15, 2013, provisional application No. 61/707,330, filed on Sep. 28, 2012.

(51) Int. Cl.
*B65D 85/60* (2006.01)
*B65D 75/28* (2006.01)
(Continued)

(52) U.S. Cl.
CPC .................. *A23G 1/40* (2013.01); *A23G 1/32* (2013.01); *A23G 1/36* (2013.01); *A23G 1/54* (2013.01);
(Continued)

(58) Field of Classification Search
CPC . A23G 1/32; A23G 1/34; A23G 1/325; A23G 1/36; A23G 1/38; A23G 1/40;
(Continued)

(56) References Cited

U.S. PATENT DOCUMENTS 1,364,192 A   1/1921   Friedman
1,768,230 A   6/1930   Borg
(Continued)

FOREIGN PATENT DOCUMENTS

AR     078079      10/2011
CA     2298199 A1   8/2000
(Continued)

OTHER PUBLICATIONS

EP 0072785 Espacenet Translation.*
(Continued)

*Primary Examiner* — Erik Kashnikow
*Assistant Examiner* — Ashley Axtell

(57) ABSTRACT

The present invention provides a heat resistant fat based confection. The heat resistance of the confection may be conferred either via inclusion of a polyol and at least one other thermal structuring component in the fat based confection, or via preparation of a premix comprising the polyol and at least one other component of the confection, or a
(Continued)

combination of these. Methods of making the fat based confection, and packaged fat based confections, are also provided.

16 Claims, 12 Drawing Sheets

(51) Int. Cl.
| | |
|---|---|
| B65D 81/38 | (2006.01) |
| A23G 1/32 | (2006.01) |
| B65D 65/38 | (2006.01) |
| A23G 1/40 | (2006.01) |
| A23G 3/42 | (2006.01) |
| A23G 1/36 | (2006.01) |
| A23G 1/54 | (2006.01) |

(52) U.S. Cl.
CPC .............. *A23G 3/42* (2013.01); *B65D 65/38* (2013.01); *B65D 75/28* (2013.01); *B65D 81/3888* (2013.01); *B65D 85/60* (2013.01); *A23V 2002/00* (2013.01)

(58) Field of Classification Search
CPC ... A23G 1/46; A23G 1/54; A23G 3/42; B65D 65/38; B65D 65/40; B65D 81/3888; B65D 81/3893; B65D 81/3818; B65D 81/389; B65D 81/3895; B65D 81/3897; B65D 81/027; B65D 85/60; B65D 3/22; B65D 75/00; B65D 75/008; B65D 75/26; B65D 75/28
USPC ....... 426/126, 660, 658, 631, 593, 410, 127, 426/106, 109, 112, 115, 118, 122, 123, 426/124, 125, 394, 398, 415
See application file for complete search history.

(56) References Cited

U.S. PATENT DOCUMENTS

| | | |
|---|---|---|
| 2,586,615 A | 2/1952 | Sherwood |
| 2,626,216 A | 1/1953 | Sherwood |
| 2,760,867 A | 8/1956 | Kempf et al. |
| 2,863,772 A | 12/1958 | Kempf |
| 2,904,438 A | 9/1959 | Orourke |
| 2,951,763 A | 9/1960 | Keily et al. |
| 2,999,017 A * | 9/1961 | Roederer ................. A23G 1/40 426/660 |
| 3,171,748 A | 3/1965 | Hendrik |
| 3,218,174 A | 11/1965 | Gian-Franco et al. |
| 3,491,677 A | 1/1970 | Bracco |
| 3,638,553 A | 2/1972 | Kreuter |
| 3,935,319 A | 1/1976 | Howard |
| 4,041,188 A | 8/1977 | Cottier et al. |
| 4,045,583 A | 8/1977 | Jeffery et al. |
| 4,081,559 A | 3/1978 | Jeffrey et al. |
| 4,098,913 A | 7/1978 | Baugher |
| 4,157,405 A | 6/1979 | Itagaki et al. |
| 4,199,611 A | 4/1980 | Ito et al. |
| 4,446,116 A | 5/1984 | Krismer et al. |
| 4,446,166 A | 5/1984 | Giddey et al. |
| 4,664,927 A | 5/1987 | Finkel |
| 4,705,692 A | 11/1987 | Tanaka et al. |
| 4,726,959 A | 2/1988 | Momura et al. |
| 4,837,041 A | 6/1989 | Maruzeni et al. |
| 4,839,192 A | 6/1989 | Sagi et al. |
| 4,847,105 A | 7/1989 | Yokobori et al. |
| 4,853,235 A | 8/1989 | Tomomatsu |
| 4,855,152 A | 8/1989 | Nakano et al. |
| 4,873,109 A | 10/1989 | Tanaka et al. |
| 4,877,636 A | 10/1989 | Koyano et al. |
| 4,882,192 A | 11/1989 | Maeda et al. |
| 4,895,732 A | 1/1990 | Suwa et al. |
| 4,923,708 A | 5/1990 | Given |
| 4,980,192 A | 12/1990 | Finkel |
| 5,004,623 A | 4/1991 | Giddey et al. |
| 5,108,769 A | 4/1992 | Kincs |
| 5,149,560 A | 9/1992 | Kealey et al. |
| 5,160,760 A | 11/1992 | Takemori et al. |
| 5,190,786 A | 3/1993 | Anderson et al. |
| 5,232,734 A | 8/1993 | Takemori et al. |
| 5,279,846 A | 1/1994 | Okumura |
| 5,281,584 A | 1/1994 | Tobey |
| 5,324,533 A | 6/1994 | Cain et al. |
| 5,326,581 A | 7/1994 | Higashioka et al. |
| 5,344,664 A | 9/1994 | Fitch et al. |
| 5,348,758 A | 9/1994 | Fuisz et al. |
| 5,409,726 A | 4/1995 | Stanley et al. |
| 5,424,090 A | 6/1995 | Okawauchi et al. |
| 5,431,947 A | 7/1995 | Bennett et al. |
| 5,431,948 A | 7/1995 | Cain et al. |
| 5,439,695 A | 8/1995 | Mackey |
| 5,445,843 A | 8/1995 | Beckett |
| 5,474,795 A | 12/1995 | Surber et al. |
| 5,476,676 A | 12/1995 | Cain et al. |
| 5,486,049 A | 1/1996 | Boatman et al. |
| 5,486,376 A | 1/1996 | Alander et al. |
| 5,505,982 A | 4/1996 | Krawczyk et al. |
| 5,523,110 A | 6/1996 | Mandralis et al. |
| 5,538,748 A | 7/1996 | Boatman et al. |
| 5,556,659 A | 9/1996 | De Pedro et al. |
| 5,753,296 A | 5/1998 | Girsh |
| 5,876,774 A | 3/1999 | Nalur et al. |
| 5,882,709 A | 3/1999 | Zumbe |
| 5,902,621 A | 5/1999 | Beckett et al. |
| 5,928,704 A | 7/1999 | Takeda et al. |
| 5,965,179 A | 10/1999 | Ducret et al. |
| 6,001,399 A | 12/1999 | Kilibwa et al. |
| 6,010,735 A | 1/2000 | Frippiat et al. |
| 6,025,004 A | 2/2000 | Speck et al. |
| 6,051,267 A | 4/2000 | Jury et al. |
| 6,063,408 A | 5/2000 | Yamazaki |
| 6,165,540 A | 12/2000 | Traitler et al. |
| 6,187,323 B1 | 2/2001 | Aiache |
| 6,251,448 B1 | 6/2001 | Destephen et al. |
| 6,258,398 B1 | 7/2001 | Okada et al. |
| 6,488,979 B1 | 12/2002 | Davila et al. |
| 6,620,450 B1 | 9/2003 | Davis et al. |
| 6,737,100 B1 | 5/2004 | Matsui et al. |
| 6,773,744 B1 | 8/2004 | Ward et al. |
| 6,783,783 B2 | 8/2004 | Clark et al. |
| 6,805,889 B1 | 10/2004 | Jury |
| 6,841,186 B2 | 1/2005 | Davila et al. |
| 6,875,460 B2 | 4/2005 | Cunningham et al. |
| 7,427,420 B2 | 9/2008 | Senba et al. |
| 7,579,031 B2 | 8/2009 | Simbuerger et al. |
| 7,727,574 B1 | 6/2010 | Ushioda et al. |
| 7,736,685 B2 | 6/2010 | Parsons et al. |
| 7,811,621 B2 | 10/2010 | Jury |
| 7,935,368 B2 | 5/2011 | Yamada |
| 8,017,163 B2 | 9/2011 | Simbuerger |
| 8,088,431 B2 | 1/2012 | Ward et al. |
| 8,231,923 B2 | 7/2012 | Okochi et al. |
| 8,293,314 B2 | 10/2012 | Bruese et al. |
| 8,323,015 B2 | 12/2012 | Day et al. |
| 8,545,921 B2 | 10/2013 | Gonus et al. |
| 8,607,980 B2 | 12/2013 | Aldricge et al. |
| 8,790,737 B2 | 7/2014 | Miguel et al. |
| 8,795,759 B2 | 8/2014 | Cantz |
| 8,802,178 B2 | 8/2014 | Wang et al. |
| 2002/0011181 A1 | 1/2002 | Cunningham et al. |
| 2002/0136818 A1 | 9/2002 | Nalur et al. |
| 2004/0131752 A1 | 7/2004 | Best et al. |
| 2005/0084598 A1 | 4/2005 | Higaki et al. |
| 2005/0118327 A1 | 6/2005 | Best |
| 2006/0210673 A1 | 9/2006 | Petrofsky et al. |
| 2007/0048431 A1* | 3/2007 | Budwig ............... A23D 7/0053 426/602 |
| 2007/0116853 A1 | 5/2007 | Krohn et al. |
| 2007/0218167 A1 | 9/2007 | Bhatia et al. |
| 2008/0241342 A1 | 10/2008 | Pearson et al. |
| 2008/0248186 A1 | 10/2008 | Bruse et al. |

(56) References Cited

U.S. PATENT DOCUMENTS

| | | |
|---|---|---|
| 2009/0317528 A1 | 12/2009 | Abylov et al. |
| 2010/0015279 A1 | 1/2010 | Zhang et al. |
| 2010/0123262 A1 | 5/2010 | Keller et al. |
| 2010/0129519 A1 | 5/2010 | Hennen et al. |
| 2010/0166911 A1 | 7/2010 | Upreti et al. |
| 2010/0183772 A1* | 7/2010 | Clanton ............... A23L 1/1643 426/93 |
| 2010/0196550 A1 | 8/2010 | Mussumeci et al. |
| 2010/0303987 A1 | 12/2010 | Watts |
| 2010/0323067 A1 | 12/2010 | Hess et al. |
| 2011/0008521 A1 | 1/2011 | Paggios et al. |
| 2011/0038995 A1 | 2/2011 | Thulin |
| 2011/0244082 A1 | 10/2011 | Vaman et al. |
| 2011/0274813 A1 | 11/2011 | Kowalczyk et al. |
| 2012/0058228 A1 | 3/2012 | Wales et al. |
| 2012/0091132 A1 | 4/2012 | Obolenski |
| 2012/0100251 A1 | 4/2012 | Baseeth et al. |
| 2012/0183663 A1 | 7/2012 | Marangoni |
| 2012/0282375 A1 | 11/2012 | Scavino |
| 2013/0264743 A1 | 10/2013 | Urushidani et al. |
| 2013/0292458 A1 | 11/2013 | Cheema et al. |
| 2014/0234492 A1 | 8/2014 | Matsuura et al. |
| 2014/0322391 A1 | 10/2014 | Althaus et al. |
| 2015/0237881 A1 | 8/2015 | Glazier et al. |
| 2015/0257407 A1 | 9/2015 | Glazier et al. |
| 2016/0000113 A1 | 1/2016 | Potter |
| 2017/0172172 A1 | 6/2017 | Wentzel et al. |

FOREIGN PATENT DOCUMENTS

| | | | |
|---|---|---|---|
| CA | 2702493 | 11/2011 | |
| CH | 409603 | 3/1966 | |
| CH | 410607 | 3/1966 | |
| CH | 519858 | 3/1972 | |
| CH | 700968 | 11/2010 | |
| CN | 1889848 A | 1/2007 | |
| CN | 101288414 | 10/2008 | |
| CN | 101448414 A | 6/2009 | |
| CN | 101835386 A | 9/2010 | |
| CN | 102187930 | 9/2011 | |
| CN | 102423947 | 4/2012 | |
| DE | 20202201 | 6/2002 | |
| EP | 0072785 | 2/1983 | |
| EP | 0189469 | 8/1986 | |
| EP | 0206850 | 12/1986 | |
| EP | 0322728 A1 * | 7/1989 | ............... B65D 1/36 |
| EP | 0407347 | 1/1991 | |
| EP | 0426155 | 5/1991 | |
| EP | 0442324 | 8/1991 | |
| EP | 688506 | 12/1995 | |
| EP | 0958747 | 11/1999 | |
| EP | 0724835 | 11/2000 | |
| EP | 1120455 | 8/2001 | |
| EP | 1288139 A1 * | 3/2003 | ......... B65D 75/5855 |
| EP | 1083043 B1 * | 12/2004 | ............. B32B 29/06 |
| EP | 2386206 | 11/2011 | |
| GB | 317335 | 8/1929 | |
| GB | 531386 A * | 1/1941 | ............... A23G 1/22 |
| GB | 847340 | 9/1960 | |
| GB | 904197 | 8/1962 | |
| GB | 1219996 | 1/1971 | |
| GB | 1219996 A * | 1/1971 | ............... A23G 1/40 |
| GB | 1538750 | 1/1979 | |
| GB | 2003912 | 3/1979 | |
| GB | 2028862 | 3/1980 | |
| GB | 2168071 | 6/1986 | |
| GB | 2391448 | 2/2004 | |
| GB | 2445539 | 7/2008 | |
| JP | S52148662 | 12/1977 | |
| JP | S5338665 | 4/1978 | |
| JP | S5359072 | 5/1978 | |
| JP | S5399362 | 8/1978 | |
| JP | 56127052 | 10/1981 | |
| JP | 57152852 | 9/1982 | |
| JP | 5914752 | 1/1984 | |
| JP | 6058052 | 4/1985 | |
| JP | 60207549 | 10/1985 | |
| JP | 61139338 | 6/1986 | |
| JP | 61224935 | 10/1986 | |
| JP | 61293344 | 12/1986 | |
| JP | 62122556 | 6/1987 | |
| JP | 6356250 | 3/1988 | |
| JP | 63192344 | 8/1988 | |
| JP | 02163039 | 6/1990 | |
| JP | 04258252 | 9/1992 | |
| JP | 04281744 | 10/1992 | |
| JP | 5227887 | 9/1993 | |
| JP | 0622694 | 2/1994 | |
| JP | 07123922 | 5/1995 | |
| JP | 07264981 | 10/1995 | |
| JP | 08168343 | 7/1996 | |
| JP | 10165100 | 6/1998 | |
| JP | 2000109879 | 4/2000 | |
| JP | 2000166475 | 6/2000 | |
| JP | 2002209521 | 7/2002 | |
| JP | 2003225055 | 8/2003 | |
| JP | 2004298041 | 10/2004 | |
| JP | 2005034039 | 2/2005 | |
| JP | 2006109762 | 4/2006 | |
| RU | 2134041 C1 | 8/1999 | |
| WO | 9119424 | 12/1991 | |
| WO | 9203937 | 3/1992 | |
| WO | 9319613 | 10/1993 | |
| WO | 9622696 | 8/1996 | |
| WO | 9922605 | 5/1999 | |
| WO | 9945790 | 9/1999 | |
| WO | 9962497 | 12/1999 | |
| WO | WO 9965323 | 12/1999 | |
| WO | 03053152 | 7/2003 | |
| WO | 2006040127 | 4/2006 | |
| WO | 2007112077 | 10/2007 | |
| WO | 2008081175 | 7/2008 | |
| WO | 2008150169 | 12/2008 | |
| WO | 2009029577 | 3/2009 | |
| WO | 2010063076 | 6/2010 | |
| WO | 2011010105 | 1/2011 | |
| WO | 2011121337 | 10/2011 | |
| WO | 2011158014 A1 | 12/2011 | |
| WO | WO 2012013348 | 2/2012 | |
| WO | 2012041629 | 4/2012 | |
| WO | 2012146920 | 11/2012 | |
| WO | 2012146921 | 11/2012 | |
| WO | 2013039831 | 3/2013 | |
| WO | 2013039873 | 3/2013 | |
| WO | WO-2013039831 A * | 3/2013 | ........... A23G 1/0036 |
| WO | 2013092643 | 6/2013 | |
| WO | WO 2014/052430 | 4/2014 | |
| WO | 2014149551 | 9/2014 | |

OTHER PUBLICATIONS

EP 0322728 Espacenet Translation.*
EP 1083043 Espacenet Translation.*
Sorbtiol PubChem Comppound Summary. National Center for Biotechnology Information. PubChem Compound Database; CID= 5780, https://pubchem.ncbi.nlm.nih.gov/compound/5780.*
Rossi, M. Future of Glycerol. Chapter 1: Glycerol: Properties and Production. 2008. Retrieved from Internet URL: <http://www.springer.com/cda/content/document/cda_downloaddocument/9780854041244-c1.pdf?SGWID=0-0-45-617604-p173815110>.*
Minifie, Bernard W. Chocolate, Cocoa and Confectionery: Science and Technology. 3rd Edition. Van Nostrand Reinhold. 1989. pp. 709-769 (Year: 1989).*
Lucisano et al. Influence of formulation and processing variables on ball mill refining of milk chocolate. European Food Research and Technology. Jan. 2006. Internet URL: https://www.researchgate.net/publication/225564834_Influence_of_formulation_and_processing_variables_on_ball_mill_refining_of_milk_chocolate.*
Chocolate Specifications, The Gazette of India, pp. 380-381, 484-486, Part III—Sec.4.

(56) References Cited

OTHER PUBLICATIONS

Dicolla, ""Characterization of Heat Resistant Milk Chocolates"", MS Thesis, Food Science, Pennsylvannia State University, Feb. 26, 2009.
Killian, ""Development of Water-in-Oil Emulsions for Application to Model Chocolate Products"", May 2, 2012.
Martinez, et al., "Influence of the Concentration of a Gelling Agent and the Type of Surfactant on the Rheological Characteristics of Oleogels", Il Farmaco, 2003, 1289-1294, 58.
Stortz, et al., ""Heat Resistant Chocolate"", Trends in Food Science & Technology, 2011, pp. 201-214, 22.
Zhong, et al., "The Technology of Making Cakes and the Recipe", Chemical Industry Press, Mar. 2009, 46-47.
Mintel Report—Milk Chocolate with a Soft Caramel Filing, Record ID: 641845, GNPD, Jan. 1, 2007, pp. 1-2, XP55348113.
Mintel Report—"Chocolate Bars—Record ID: 1533765"—GNPD, Apr. 1, 2011, pp. 1-2, XP55348105.
Mintel Report—"Orange Caramel Limited Edition Chocolate Bar"—Record ID: 87112, GNPD, Mar. 1, 2008, pp. 1-2—XP55348116.
English translation Office action dated Sep. 27, 2017.
Minifie, "Chocolate, Cocoa and Confectionery 3rd Edition", Chocolate, Cocoa and Confectionery 3rd Edition, Chapman and Hall, 1989, p. 139.
Minifie, "Chocolate, Cocoa, and Confectionery 3rd Edition", Chapman and Hall, 1989, p. 111.
Schaefer, Hendrik, "Analysis of Nonstarch Polysaccharides in Cocoa Powder by a New Micromethod", J. Agric. Food Chem., vol. 31, 1983, 1375-1376.
International Search Report for Int. App No. PCT/US2013/061645, dated Dec. 18, 2013 (4 pages).
International Preliminary Report on Patentability and Written Opinion for Int. App No. PCT/US2013/061645, dated Mar. 31, 2015 (9 pages).
EP Communication for EP App No. 13774024.7 dated Jul. 11, 2016 (11 pages).
EP Communication for EP App No. 13774024.7 dated Feb. 28, 2017 (6 pages).
CN First Office Action for App No. CN 201380050914, dated Dec. 7, 2016 (8 pages).
CN Second Office Action for App No. CN 201380050914, dated Aug. 27, 2017 (9 pages).
CN Supplemental Search Report for App No. CN 201380050914, dated Aug. 21, 2017 (2 pages).
Almeida, et al., "Evaluation of the physical stability of two oleogels," International Journal of Pharmaceuticals, 2006, 327:73-77.
Bourne, et al., "Texture profile analysis," Food Technology, 1978, 32:62-66.
Goh, et al., "Determination of mono- and diglycerides in palm oil, olein, and stearin," JAOCS, 1985, 62(4):730-734.
Potter, "Food Science," 2nd Ed., The AVI Publishing Company, Inc., Westport, CT., 1973, 49-50.
Siew, et al., "Diglyceride content and composition as indicators of palm oil quality," J. Sci. Food Agric., 1995, 69:73.
Stopsky, et al., "Chemistry of fats and by-products of processing raw fat materials", Moscow, Kolas, 1992, 153-154.
Swem, "Bailey's industrial oil and fat products," 4th Ed., John Wiley and Sons, New York, 1979, 46-51.
Beckett, Ed., Industrial Chocolate Manufacture and Use, 4th Ed., 2009, pp. 198-199 and 244-245.
Christensen, "Food Science: Why Chocolate Siezes," Apr. 2008, pp. 1-2, URL <https://www.thekitchn.com/food-science-why-chocolate-seizes-48510>.
dictionary.com, "purity," printed Sep. 30, 2019 from URL <https://www.dictionary.com/browse/purity?s=t>.
International Search Report and Written Opinion in PCT Appln. No. PCT/US2013/061400, dated Dec. 17, 2013, 14 pages.
International Search Report and Written Opinion in PCT Appln. No. PCT/US2013/061627, dated Dec. 17, 2013, 14 pages.
Lees, et al., "Sugar confection and chocolate manufacture," Leonard Hill, 1973, pp. 124-125.
Mohos, Confectionery and Chocolate Engineering: Principles and Applications, 2010, pp. 26-27 and 46-47.
Pfeiffer, et al., "The Art of French Pastry," Random House, 2013, p. 208.
[No Author Listed], "Opponent's Experimental Report #2," filed on Aug. 18, 2021 in response to EP Summons to Attend Oral Proceedings in EP Patent No. EP2900074, 52 pages.
[No Author Listed], "Opponent's Experimental Report," filed on Sep. 3, 2020, in response to EP Communication pursuant to Article 101(1), Rule 81(2), and to Patentee Response in EP Patent No. EP2900074, 32 pages.
[No Author Listed], "Summary of Examples of EP 2900074 B1," filed on Sep. 3, 2020, in response to EP Communication Pursuant to Article 101(1), Rule 81(2), and to Patentee Response in EP Patent No. EP2900074, 1 page.
[No Author Listed], "Experimental Report Filed by Patent Proprietor," filed on Feb. 25, 2020, in response to EP Communication of Notice of Opposition Pursuant to Rule 79(1) EPC, 2 pages.
Decision by Opposition Division in EP Patent No. 2900074, dated Dec. 10, 2021, 33 pages.
Glazier, Barry D., "Declaration," filed on Aug. 19, 2021 in response to EP Summons to Attend Oral Proceedings in EP Patent No. EP2900074, 15 pages.
Notice of Opposition in EP Patent No. 2900074, dated Oct. 2, 2019, 25 pages.
Response filed by Opposition in EP Patent No. 2900074, response to EP Communication Pursuant to Article 101(1), Rule 81(2), and to Patentee Response, dated Sep. 3, 2020, 8 pages.
Response filed by Opposition in EP Patent No. 2900074, response to EP Summons to Attend Oral Proceedings, dated Aug. 18, 2021, 6 pages.
Response filed by Patentee in EP Patent No. 2900074, response to EP Communication of Notice of Opposition Pursuant to Rule 79(1) EPC, dated Feb. 25, 2020, 14 pages.
Response filed by Patentee in EP Patent No. 2900074, response to EP Summons to Attend Oral Proceedings, dated Aug. 19, 2021, 4 pages.

* cited by examiner

Time = 0 min

Time = 20 min

Time = 30 min

Time = 33 min

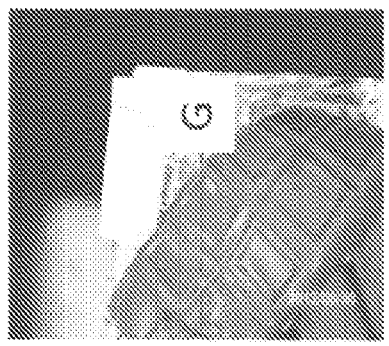
FIGURE 7A
FIGURE 7B
FIGURE 7C
FIGURE 7D
FIGURE 7E
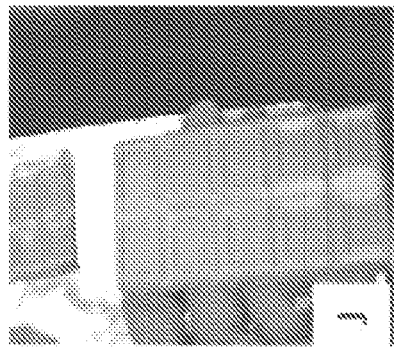
FIGURE 7F

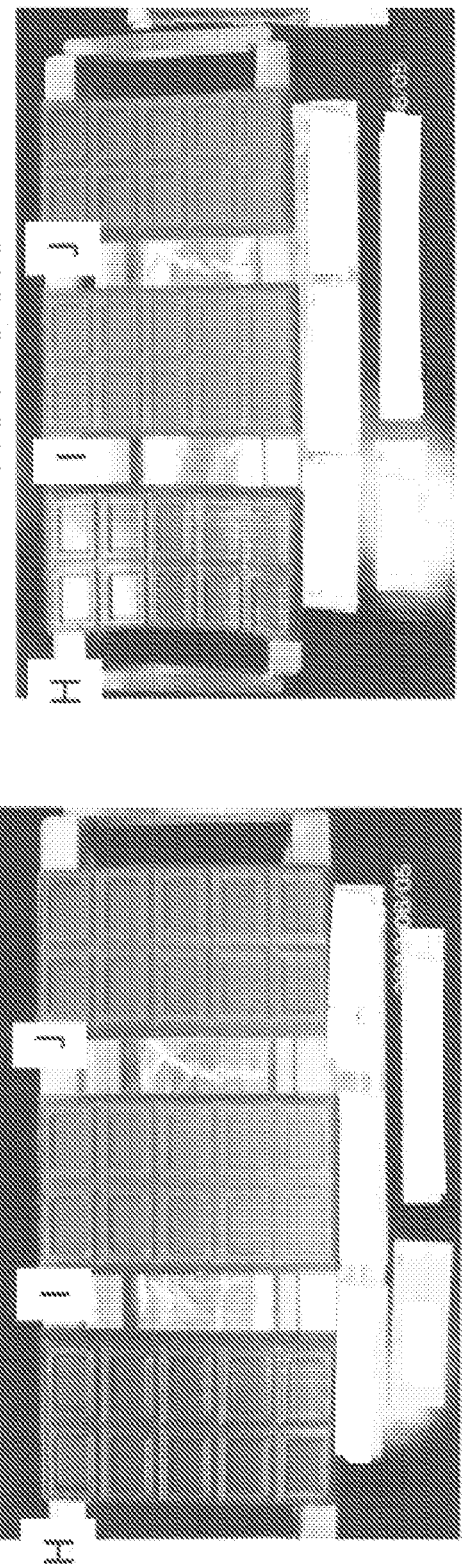
FIGURE 10B
FIGURE 10A
FIGURE 10C

HEAT RESISTANT CHOCOLATE

FIELD

The present invention relates to heat resistant chocolate compositions, packaged heat resistant chocolate compositions, and methods for making these.

BACKGROUND

Much of the desirable eating experience of chocolate confectionery is related to its ability to melt quickly and completely to provide the consumer thereof with a lubricious, indulgent eating experience. This ability, in turn, is often directly relatable to the use of cocoa butter as at least a portion of the fat component in the confection. With a sharp melting point very near 37° C., cocoa butter provides the desirable melting profile upon ingestion, and thus, a large component of the desired overall consuming experience.

However, what is a desirable trait from a consumer's perspective is not necessary a positive attribute from a manufacturing, shipping and/or handling perspective. For example, the ability of chocolate confections to melt quickly and completely at 37° C. can become a product storage and quality concern, in particular in geographies where the environmental temperature averages at or above 37° C. These concerns may be exacerbated in regions where economic circumstances are not conducive to the wide spread use of refrigerated storage.

It would thus be desirable to provide heat resistant chocolate confections that provide the desired organoleptic experience, that are yet capable of substantially maintaining their shape and/or structure prior to consumption, i.e., during shipment, storage and/or other handling. Further advantages would be provided if the confections could be manufactured with little, or no, additional added expense, whether in the form of raw materials, capital equipment, or utility costs.

BRIEF DESCRIPTION

The present invention provides a heat resistant fat based confection. The heat resistance of the confection may be conferred either via inclusion of a polyol and at least one other thermal structuring component in the fat based confection, or via preparation of a premix comprising the polyol and at least one other component of the confection, or a combination of these. The inclusion of at least one other thermal structuring component, or the preparation of a premix comprising the polyol, may at least additively, and perhaps synergistically, act with the polyol to provide a fat based confection having a more robust heat resistance as compared to confections prepared with a polyol alone. In some embodiments, no free water is added to the confection, while in these and/or others, the amount of water in the fat based confection may be minimized by using a polyol having a low water content.

In one aspect, a fat based confection is provided. The fat based confection comprises a polyol having a boiling point of 105° C. or greater, at least one other thermal structuring component, and no added free water. The polyol may be glycerin, sorbitol, maltitol, mannitol, xylitol, lactitol, isomalt, erythritol, or combinations of these, and in some embodiments, is glycerin. The at least one other thermal structuring component is advantageously a component typically included in fat based confections, and in some embodiments, comprises a monosaccharide, e.g., dextrose, glucose, fructose, galactose, polysaccharides of these, hydrates of these, or combinations of any of these. In some embodiments, the monosaccharide comprises dextrose, dextrose monohydrate, or a combination of these.

In order to provide the fat based confection with the desired sweetness level, in those embodiments wherein the at least one other thermal structuring component, the amount of bulk sweetener otherwise included in the fat based confection may be reduced, and in some embodiments, the fat based confection may not comprise lactose. Emulsifiers or other surface active agents may be used, and so, in some embodiments, the fat based confection comprises lecithin. The taste profile of the heat resistant fat based confection is surprisingly not significantly different from that of a conventional fat based confection, i.e., not prepared with the polyol, one other thermal structuring component and added water.

It has further been surprisingly been discovered that the heat resistance of the fat based confection may be provided by providing a premix of the polyol and at least one other component of the fat based confection. The level of heat resistance provided is better, or more robust than, heat resistant confections comprising glycerin, but not prepared via the premix.

And so, in another aspect, a pre-mix for a fat based confection is provided. The premix comprises a polyol having a boiling point above 105° C. and less than all components of the fat based confection. In such embodiments, the polyol desirably comprises glycerin, sorbitol, maltitol, mannitol, xylitol, lactitol, isomalt, erythritol, or combinations of these, and desirably comprises glycerin. The other components of the fat based confection include a natural and/or artificial sweetener, a fat component, and a nonfat solids component. In some embodiments, the premix may comprise a natural and/or artificial sweetener and at least one nonfat solids component, and in such embodiments, the premix may comprise a crumb.

In some embodiments, a fat based confection prepared from the premix may further comprise the at least one thermal structuring component, and in these embodiments, the thermal structuring component may be a monosaccharide. In such embodiments, the thermal structuring component may be included in the premix, either alone, or in combination with the sweetener.

Methods of making the fat based confection, or making a fat based confection using the premix, are also provided. The methods may include a refining step to reduce the particle sizes of the confection, or of the at least one thermal structuring component, e.g., the monosaccharide. Tempering, molding, enrobing or coating, solidifying, packaging and curing steps, e.g., for periods of from 3 to 20 days, may also be included in the method.

The heat resistance of the fat based confections may be enhanced by packaging the same in multilayer packaging, and so, packaged fat based confections and packaged fat based confections prepared using the premix are also provided. The multilayer package may generally comprise one or more foil layers, flexible laminate or flow wrap layers, fat wicking layers, insulative layers, coatings on any of these, and combinations of these. The packaging may further include one or more aesthetic elements, such as dimples, knurls, undulations, burls, or combinations of these.

BRIEF DESCRIPTION OF THE DRAWINGS

FIG. 7A is a photograph of the tactile testing of a confection comprising only glycerin, prepared via premix, (sample E), after 5-7 days at 38° C.;

FIG. 7B is a photograph of the tactile testing of a confection comprising a monosaccharide, glycerin and lactose, wherein the mixture is roll refined to provide a smaller particle size (sample F), after 5-7 days at 38° C.;

FIG. 7C is a photograph of the tactile testing of a confection comprising equal amounts of lactose and a monosaccharide and glycerin (sample G) after 5-7 days at 38° C.;

FIG. 7D is a photograph of the tactile testing of a confection comprising only glycerin (prepared via premix, sample H) after 5-7 days at 38° C.;

FIG. 7E is a photograph of the tactile testing of a confection comprising a monosaccharide, glycerin and lactose, wherein the mixture is roll refined to provide a smaller particle size (sample I) after 5-7 days at 38° C.;

FIG. 7F is a photograph of the tactile testing of a confection comprising equal amounts of lactose and a monosaccharide and glycerin (sample J) after 5-7 days at 38° C.;

FIG. 10A is a photograph showing the rack testing of samples H-J at 38° C. at time zero;

FIG. 10B is a photograph showing the rack testing of samples H-J at 38° C. at 30 minutes;

FIG. 10C is a photograph showing the rack testing of samples H-J at 38° C. at 45 minutes.

DETAILED DESCRIPTION

Figure 1:
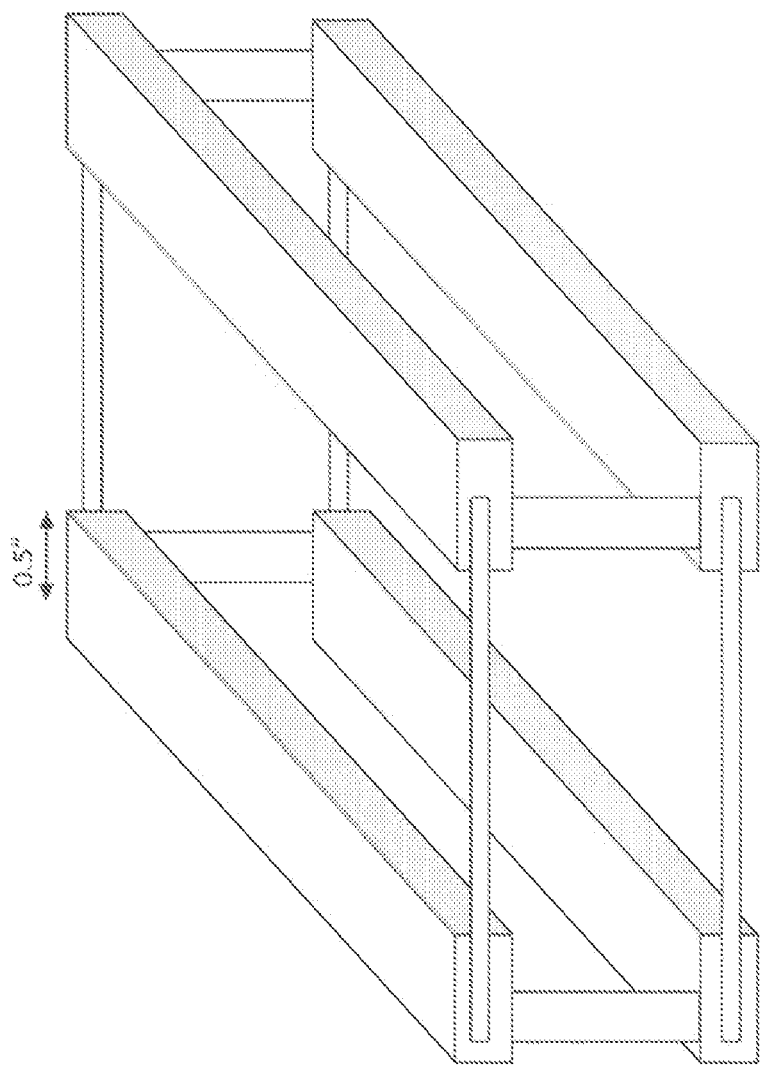
FIG. 1 is a schematic representation of a rack utilizing in the rack testing of some embodiments.
Figure 2A:
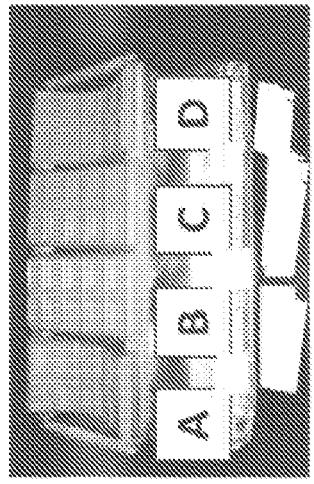
FIG. 2A is a photograph showing the rack testing at 38° C. of a confection comprising a monosaccharide and no glycerin or lactose (sample A); a confection comprising a monosaccharide, glycerin, and no lactose (sample B); a confection comprising a monosaccharide, twice the amount of glycerin as sample B and no lactose (sample C); and a confection comprising a monosaccharide, lactose and no glycerin (sample D) at time 0.
Figure 2B:
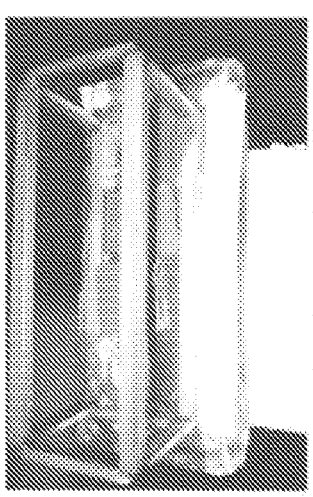
FIG. 2B is a photograph showing the rack testing of the 4 samples shown in FIG. 2A at 20 minutes.
Figure 2C:
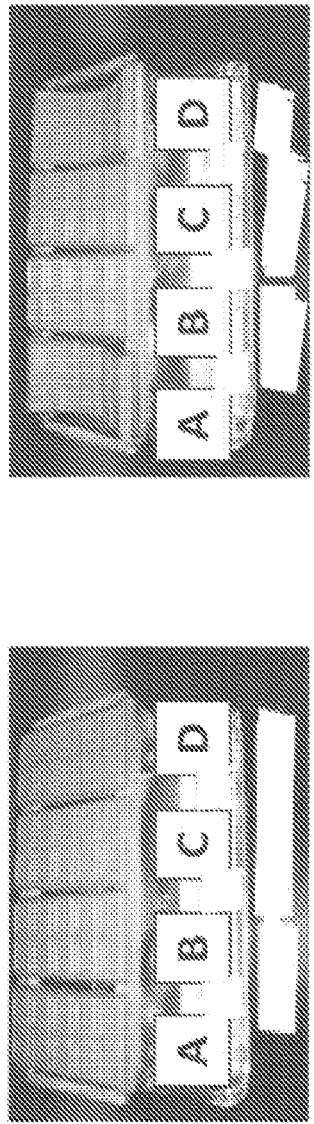
FIG. 2C is a photograph showing the rack testing of the 4 samples shown in FIG. 2A at 30 minutes.
Figure 2D:
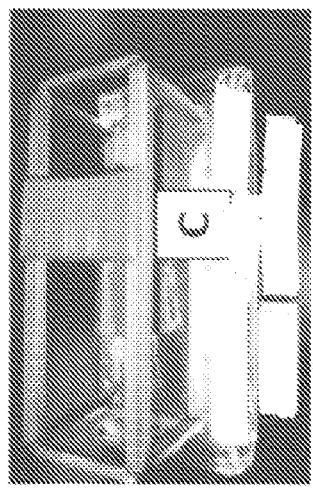
FIG. 2D is a photograph showing the rack testing of the 4 samples shown in FIG. 2A at 33 minutes.

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.). As used herein, percent (%) conversion is meant to indicate change in molar or mass flow of reactant in a reactor in ratio to the incoming flow, while percent (%) selectivity means the change in molar flow rate of product in a reactor in ratio to the change of molar flow rate of a reactant.

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As used herein the term "heat resistant" means a fat based confection that retains its shape and/or can be handled without leaving a residue after exposure to elevated temperatures, temperatures of at least 30° C., or 32° C., or 34° C., or 36° C., or even 37 C or greater. Ways of measuring heat resistance can include rack testing and tactile testing. Rack testing is a method used to determine the extent to which a fat based confection retains its shape upon exposure to various temperatures and tactile testing is a method used to determine the extent to which a fact based confection can be handled without leaving a residue. The phrase "fat based confection" means any confection including at least 17, or 20, or 23, or 25, or 27 or 29, or 30 or greater percent fat, from any source. In some embodiments, a fat based confection includes cocoa solids and/or cocoa butter/cocoa butter alternative.

The present invention provides a heat resistant fat based confection. The heat resistance of the confection may be conferred either via inclusion of a polyol and at least one other thermal structuring component in the fat based confection, or via preparation of a premix comprising the polyol and at least one other component of the confection, or a combination of these. The presence of the polyol is known to assist in the formation of a heat resistant structure in the fat based confection, but its use alone may not provide heat resistance sufficient for all desired applications and/or markets. The inclusion of at least one other thermal structuring component, or the preparation of a premix comprising the polyol, may at least additively, and perhaps synergistically, act with the polyol to provide a fat based confection having a more robust heat resistance as compared to confections prepared with a polyol alone.

Advantageously, the polyol has a boiling point greater than 105° C. so that at least some portion, desirably a majority (greater than 50%), and more desirably substantially all (e.g., greater than 75 wt %, or 80 wt %, or 85 wt %, or 90 wt %, or 95 wt %, or even greater than 99 wt %), of the polyol will remain within the fat based confection during processing, including any curing period, thereof. Desirably the polyol will have a FEMA and/or GRAS designation, and may have a boiling point greater than 110° C., 120° C., 130° C., 140° C., 150° C., 160° C., 170° C., 180° C., 190° C., 200° C., 210° C., 220° C., 230° C., 240° C., 250° C., 260° C., 270° C., 280° C. or even 290° C. For example, suitable polyols that are believed to be capable of assisting in the formation of a heat resistant structure within the fat based confection and that will not evaporate during any curing thereof, include, but are not limited to, glycerin, sorbitol, maltitol, mannitol, xylitol, isomalt, lactitol and erythritol. Combinations of these are also suitable.

While isomers or derivatives, including hydrates and hydrogenates, of the polyol(s) may be used, the polyol need not be encapsulated, gelled, polymerized, or otherwise altered from its purchased state to be used in the fat based confections provided. Rather, the chosen polyol(s) may advantageously be used 'as is'.

In some embodiments, the polyol desirably comprises glycerin. Glycerin may be a particularly preferred polyol inasmuch as grades of glycerin are commercially available with very little water content, i.e., less than 5%, 4%, 3%, 2%, 1% or even less than 0.9%, or less than 0.8%, or less than 0.7%, or even less than 0.6%, or about 5% water or less. Glycerin can thus act as a 'solvent' for the sweetener in a fat based confection without introducing the detrimental effects of water. The minimization of water in the fat based confection and/or premix, is desirable due to the deleterious effects water can have on the rheology and taste profile of the fat based confection. The presence of even small amounts of water also introduces the potential for microbial growth in the fat based confection.

Indeed, in embodiments wherein the fat based composition comprises the polyol and at least one other thermal structuring component, the present fat based confections desirably comprise no added water. That is, although some components of the fat based composition may inherently include small amounts of water, so that the presence of small amounts of water, e.g., less than 1%, are unavoidable, the present fat based confections do not have any water added thereto as free water. As a result, the fat based confections have only that amount of water present in the other components utilized, e.g., a total water content of less than 1 wt %, or less than 0.9 wt %, or less than 0.8 wt %, or less than 0.7 wt %, or less than 0.6 wt %, or less than 0.5 wt %, or less than 0.4 wt %, or less than 0.3 wt %, or less than 0.2 wt %, or in some embodiments, less than even 0.1 wt % water.

In those embodiments wherein the fat based composition is prepared from a premix, the premix may comprise an amount of water that is later removed by processing. For example, in those embodiments wherein the premix comprises a crumb, the crumb may be hydrated during the preparation thereof, and subsequently dried to provide the finished, or anhydrous crumb. That is, even though free water may be added to a crumb, the dried finished crumb would comprise no substantial amount of free water.

In addition to the polyol, the fat based confection desirably comprises at least one other thermal structuring component. Desirably, the additional thermal structuring component will act at least additively, and in some embodiments, may even act synergistically, with the polyol, e.g., to provide the heat resistant structure, or to enhance the heat resistant structure provided by the polyol. Advantageously, the at least one additional thermal structuring component will be one suitable for use in a food product, and even more advantageously, may be a component typically included in some fat based confections.

For example, in some embodiments, the at least one additional thermal structuring component may desirably be a monosaccharide. In such embodiments, while the fat based confection may be sweetened conventionally, i.e., as by the inclusion of sucrose, one or more monosaccharides may be included that act as the at least one thermal structuring component. While not wishing to be bound by any theory, it is believed that the monosaccharide interacts with the polyol to form or enhance the heat resistant structure of the fat based confection. Monosaccharides may interact more readily with the glycerin, e.g., than the disaccharide bulk sweetener sucrose, and therefore more amenable or able to form the desired heat resistant structure. This interaction and the structure formed thereby are advantageously maintained over the processing of the fat based confection, including any period at elevated temperatures, e.g., curing, shipping and/or storage periods, since the polyol does not evaporate out at temperatures typically experienced by the fat based confection during such periods.

This interaction and its effects are surprising since typically, monosaccharides have been included, if at all, in fat based confections, in order to achieve a desired level of sweetness in a fat based confection without detrimentally impacting the desirably smooth and creamy texture. That is, because of the relatively small particle size compared to conventional bulk sweeteners, e.g., sucrose, monosaccharides are not typically associated with imparting a 'grainy' texture to fat based confections in which they may be used.

Furthermore, during fat based confectionery processing operations such as conching, fat tends to coat the small monosaccharide particles not only keeping them discrete and relatively inert, but also further minimizing any impact they may have on the texture of the fat based confection. As such, those of ordinary skill in the art have conventionally not turned to monosaccharides to interact with other components, whether to impart structure or for any other reason. In some embodiments, the monosaccharide may be milled to a particle size of from about 10 microns to about 30 microns. In such embodiments, those of ordinary skill would be even less expectant that the monosaccharide would participate in the formation of any heat resistant structure.

Indeed, conventional methods of providing heat resistance via formation of a lattice structure using bulk sweeteners, while generally inclusive of monosaccharides, are typically directed primarily at more conventionally utilized disaccharides, e.g., sucrose. Even so, such conventional methods teach that the water (or other solvent) necessarily included in order to mobilize the bulk sweeteners in the fat based confections prepared thereby, must be removed for the bulk sweetener to form the structure thought to impart heat resistance.

Such methods, and the confections prepared thereby, thus not only include amounts of water detrimental to processing, but also, amounts of water that may invite bacterial growth during the manufacturing process. Furthermore, confections with added water may typically not provide the taste and texture desired by consumers, and as a result, these products are not typically commercially successful.

In contrast, the present confections, premixes, and methods of making the same do not include any added water, and in fact, in those embodiments wherein glycerin is used as the polyol, even those amounts of water added via the inclusion thereof in the components thereof is minimized, as in some embodiments, glycerin having a purity of 99% or greater may be used. The present compositions therefore do not sacrifice taste or texture attributes, and are expected to enjoy greater commercial success than heat resistant confections with added water.

The monosaccharide utilized as the at least one thermal structuring component is not particularly limited, and any may be utilized. For example, suitable monosaccharides include dextrose, fructose, galactose, polymeric forms of these, anhydrous forms of these, hydrates of these, or combinations of these. In some embodiments, the monosaccharide is desirably dextrose, dextrose monohydrate, anhydrous dextrose, or combinations of these. Of these, dextrose monohydrate and anhydrous dextrose are preferred, and dextrose monohydrate is particularly preferred. While not wishing to be bound by any theory, it is believed that the molecule of water present in dextrose monohydrate, as opposed to the lack thereof in anhydrous dextrose may interact with the other bulk sweeteners in combination with the polyol to form or enhance the heat resistant structure of the fat based confection.

In some embodiments, the dextrose provides a further sensory benefit due to its negative heat of solution. Dextrose has a negative heat of solution of about −25.2 cal/gm and thus can impart a cooling sensation that improves the sensory experience of the confection. In some embodiments, the sensory benefit is experienced when dextrose is used in an amount of less than 8% w/w by weight of the confection while in other embodiments dextrose is used in an amount of from about 1% to about 8% w/w by weight of the confection. In still other embodiments, dextrose is used in an amount of from about 1.5% to about 4% w/w by weight of the confection.

Other materials that provide a negative heat of solution can be used instead of or in combination with dextrose to provide the sensory benefit of a cooling sensation. The materials include polyols such as sorbitol, mannitol, maltitol, xylitol, lactitol, hydrogenated isomaltulose, erythritol. In some embodiments, a cooling sensation can be provided by including a polyol with a negative heat of solution in an amount of from about 0.5% to about 15% w/w by weight of the confection. In some embodiments, the polyol with a negative heat of solution is selected from the group comprising sorbitol, mannitol, xylitol, erythritol, and combinations thereof.

Other than the polyol, and in some embodiments, the monosaccharide, the fat based confection advantageously comprises only components that may typically be utilized in the same, e.g., at least a sweetener, a fat component, and a nonfat solids component. That is, whereas conventional formulations for heat resistant confections may typically include additional ingredients that impart the heat resistance, e.g., such as gelling agents, including hydrocolloids, fibers, humectants, etc., the present fat based confections utilize known components, albeit in new formulations and/or combinations. As such, the additional expense associated with the use of less conventional components, including initial cost, and potentially capital, utility and other implementation costs, is minimized or completely avoided.

Sweeteners suitable for use in fat based confections include any natural sugar, i.e., suitable sweeteners include sucrose, dextrose, galactose, fructose, lactose, maltose, corn syrup solids, molasses, isomers and other derivatives of these, and combinations of any number of these. Sugar alcohols may also be used to sweeten fat based confections, and these include glycerin, sorbitol, isomalt, lactitol, maltitol, mannitol, xylitol, erythritol and the like. In those embodiments wherein a sugar alcohol is desirably used to sweeten the fat based confection, the aforementioned polyol may be used, and may be used in amounts greater than that required to provide the heat resistance. Or, the polyol used in the fat based confection may have a dual functionality and may act to provide the heat resistance and to provide at least a portion of the desired sweetness to the fat based confection.

Similarly, the amount of the monosaccharide (if any) used as the thermal structuring component may typically also contribute to the sweetness of the fat based confection. Or, in some embodiments, additional amounts of the monosaccharide used as the at least one structuring component may be utilized as at least a portion of the sweetener of the fat-based confection. In the case of the former, adjustments to the amount of sweetener used in the fat based confection may be desired.

That is, in those embodiments wherein a monosaccharide is used as the at least one other thermal structuring component, the amount of sweetener in the fat based confection may be reduced in order to provide a fat based confection with the desired level of sweetness. In such embodiments, the amount of any other sweetener may be reduced in an amount that will provide the desired sweetness level. For example, in some embodiments, the amount of lactose included in the fat based confection will be reduced. In others, any amount of lactose otherwise desirably included in the fat based confection may be entirely replaced by the monosaccharide thermal structuring component.

Artificial sweeteners may also be utilized in fat based confections and examples of these include aspartame, acesulfame-k, cyclamates, saccharin, sucralose, nechesperidin, dihydrochalone, alitame, glycyrrhizin, or combinations of these. Desirably, the sweetener comprises sucrose, lactose, molasses or combinations thereof. More desirably, the sweetener comprises sucrose, lactose or combinations thereof.

The fat component of the fat based confection may typically be any animal or vegetable based fat, but may also be synthetic, if substantially similar to useful animal or vegetable fats. Desirably, the fat component will comprise cocoa butter, butterfat, cocoa butter replacers, cocoa butter equivalents, cocoa butter substitutes, animal fat, vegetable fat, or combinations of these.

Cocoa butter equivalents include illipe, Borneo tallow, tengkawant, palm oil, sal, shea, kokum gurgi and mango kernel. Cocoa butter substitutes include laurics, which may typically be based upon palm kernel oil and coconut oil, and non-laurics, which may include soya, cottonseed, peanut, rapeseed and corn oil. Suitable vegetable oils include many of the non-lauric cocoa butter substitutes, i.e., corn oil, cottonseed oil, rapeseed oil, and also include palm oil, safflower and sunflower oil. In some embodiments, the fat component comprises cocoa butter.

The nonfat solids component may comprise cocoa solids, milk solids or combinations of these.

The fat based composition may further comprise an emulsifier. It bears noting, however, that since the present fat based confections do not include any added free water, and so only comprise amounts of water present in other components, any emulsifier used in the fat based confection is more likely exerting a surface active effect than a true emulsification. That is, during confectionary manufacture, the sweetener and other solid particulates are desirably substantially all suspended in a continuous fat phase. The presence of surface active agents and/or emulsifiers facilitates the formation of fat phase that desirably coats the particulates in the confectionary formulation.

Many emulsifiers are known to those of ordinary skill in the art that are suitable for use in food, and any of these may be utilized. Suitable emulsifiers include, e.g., lecithin, including soy lecithin as well as lecithin derived from other vegetable sources, such as soybean, safflower, corn, etc., fractionated lecithins enriched in phosphatidyl choline, phosphatidyl ethanolamine, phosphatidyl inositol, or combinations of these, monophosphate derivatives or diacetyl tartaric acid esters of mono- and diglycerides (sometimes referred to as PMD/DATEM), monosodium phosphate derivatives of mono- and diglycerides of edible fats or oils, sorbitan monostearate, polyoxyethylene sorbitan monostearate, hydroxylated lecithin, lactylated fatty acid esters of glycerol and propylene glycol, polyglycerol esters of fatty acids, propylene glycol mono- and di-esters of fats and fatty acids, sucrose polystearate, ammonium phosphatide, sucrose polyerucate, polygylcerol polyricinoleate, and the like. Combinations of any number of these may also be used. Typically, such agents may be included in confections in amounts of less than 1 wt %, or more typically, from 0.1 wt % to 0.3 wt %, based upon the total weight of the fat based confection.

The additive and/or synergistic effects provided by utilizing a combination of a polyol having a boiling point greater than 105° C. and at least one other thermal structuring component can also surprisingly be provided by simply mixing the polyol with the other components of the fat based confection in a certain way. That is, in some embodiments, heat resistant fat based confections can be provided by including the polyol and at least one other component of the fat based confection in a premix, prior to adding the premix to the remaining ingredients (or adding the remaining ingredients to the premix). In such embodiments, the use of an additional thermal structuring component may not be necessary, although it may be included, if desired.

While not wishing to be bound by any theory, it is believed that, when so provided, the polyol may interact with the additional component and/or the additional component may assist with the dispersion of the polyol, or vice versa, within the fat based confection. Whatever the mechanism, it has been discovered that utilizing the premix provides a more heat resistant fat based confection, or a fat based confection with similar heat resistance, but improved organoleptic and/or rheological properties, than fat based confections comprising the same or similar ingredients that were not so prepared.

Because the polyol is substantially retained in the final fat based confection, the effects thereof are retained, it is believed to a greater degree than conventional heat resistant confections that utilize a lower boiling point polyol for this purpose. Furthermore, the benefits provided by incorporating the premix into a fat based confection can be realized without the requirement of additional processing steps or equipment required by some conventional heat resistant fat based confections. For example, some conventional heat resistant confections require the use of finely milled sweeteners, e.g., to a particle size on the order of nanometers, apparently under the assumption that such a small particle size will assist in the formation of a sugar lattice within the confection that will then impart some level of heat resistance. Not only can such milling equipment be expensive from a capital cost perspective, but it can also take up valuable manufacturing space and time. In contrast, the present premix and fat based confections do not require the purchase of additional equipment, and/or allocation of time and space resources.

Although the word "premix" is used, no order is intended to be implied. That is, the combination of polyol and at least one other component of the confection need not be prepared prior to the combination of the remaining components. Rather, all that is required is that the polyol be combined with at least one component of the fat based confection prior to this combination being incorporated into, or with, the remaining ingredients. So long as the polyol is combined with at least one of these prior to the combination of the premix with the remaining components or vice versa (the combination of the remaining components, the preparation of the premix including at least one component and the polyol, and the combination of these two), it is believed that the polyol will assist in, or contribute to, the formation of a heat resistant structure in the complete fat based confection.

For example, the fat component and nonfat solids component may be combined, the polyol and the sweetener may be combined and then the two combinations thereafter combined. Or, the polyol and the fat component may be combined, and have added thereto the nonfat solids and the sweetener either separately or combined. Or, the polyol and the nonfat solids component may be combined, and the fat component and sweetener may be combined and the two combinations thereafter combined, etc. In one embodiment, the polyol is combined with the sweetener, and the nonfat solids and fat component are thereafter added, either together, or separately.

In some embodiments, the polyol is added to a crumb to provide a premix. As those of ordinary skill in the art are aware, a crumb may typically include at least milk (or milk solids and water), and sugar and/or cocoa or other stability enhancing components. The combination exhibits a longer shelf stability than liquid milk, and may have a different flavor than milk solids.

In such embodiments, the crumb may either be hydrated, i.e., may be a crumb paste, or anhydrous, i.e., be a finished crumb when the polyol is added thereto. If the crumb, and thus premix, is hydrated, any added water may be removed via drying to provide a finished crumb, and so, fat based confections produced via such a premix would not comprise substantial amounts of free water. Or, the polyol may be used to replace a portion of any water used to hydrate the crumb paste. Advantageously, the temperatures typically used to dry a crumb paste to drive off any added water and provide a finished crumb are lower than the boiling point of the polyol, and so, substantial amounts of the polyol are not lost during processing of the crumb.

Additionally, more than one of each component may be included in the premix and fat based confection, and in such embodiments, only one, more than one, or all of each component may be included in the premix. For example, the fat based confection may comprise fat solids comprising cocoa butter and butter fat, in which case, the premix may comprise the cocoa butter and the complete fat based confection may comprise the butter fat, and vice versa.

Or, the fat based confection may desirably comprise a combination of sweeteners, and may or may not include the monosaccaraide thermal structuring component. If the fat based confection does comprise the monosaccharide, it may be included in the premix, and the sucrose and artificial sweetener provided in the complete fat based confection. Or, any monosaccharide and sucrose may be provided in the premix and the artificial sweetener provided in the completed fat based confection. Alternatively, the sucrose may be provided in the premix and any monosaccharide and artificial sweetener may be provided in the complete fat based confection, etc.

While not necessary, it is believed that the provision of the monosaccharide in the premix allows the polyol and monosaccharide to interact and begin to form a heat resistant structure prior to the addition of the disaccharide, which may than also incorporate into, or otherwise add to, any heat resistant structure established in the premix by the polyol and monosaccharide. To provide a desirably smooth texture, the monosaccharide in these embodiments may be milled to a particle size of from about 10 microns to about 30 microns prior to combining it with the polyol. These embodiments may thus be preferred.

Similarly, a portion of a single component may be provided in the premix with the remainder provided in the final fat based confection. For example, if the fat based confection is to comprise nonfat solids including cocoa solids and milk solids, a portion of the milk solids may be provided with the premix and the remainder of the milk solids and cocoa solids provided in the final fat based confection. Or, a portion of the cocoa solids may be provided in the premix with the remainder of cocoa solids and milk solids provided in the final fat based confection.

The premix provided herein is advantageous in that its incorporation into a fat based confection can either additively, and perhaps synergistically, enhance the heat resistance of a fat based confection that includes a polyol. That is, fat based confections prepared only with the polyol may not exhibit the robust heat resistance necessary or desired in all applications or environments. However, preparing heat based confections comprising a polyol according to the method herein can provide the resulting fat based confections with a more robust heat resistance than fat based confections comprising a polyol and prepared conventionally.

Furthermore, in such embodiments, the benefit of enhanced heat resistance can be seen without requiring the use of additional equipment not conventionally used in confectionary manufacture to pretreat any conventional components, i.e., milling equipment to reduce the particle size of conventional components, or microwave ovens.

Once all ingredients have been combined, whether with or without the premix, the fat based composition may become very viscous, i.e., the composition may exhibit reduced flow characteristics or enter a plastic phase for a time. And so, in some embodiments, advantage may be seen by continuing to mix the final composition until the composition has regained its ability to flow, i.e., until the apparent viscosity has reduced. Mixing may be low shear, such as via a planetary mixer, or may be high shear, as provided by a scraped surface heat exchanger. Additional mixing may be carried out after the apparent viscosity has reduced, and may be carried out either at high speed/shear or low speed/shear.

In order to ameliorate, or postpone at least a portion of, any such viscosity increase, in those embodiments wherein the chocolate composition comprises the polyol and at least one other thermal structuring component, one or both may be added either before or after tempering. That is, inasmuch as the addition of one or more polyols can have the affect of elevating the viscosity of the fat based confection, addition of at least the polyol, and in some embodiments, both the polyol and at least one other structuring component, can defer this effect until after the other processing steps.

Because the fat based confection would have undergone conching at this point, and be at a processable viscosity, it is possible that the addition of the polyol and/or at least one other thermal structuring component will not alter the viscosity, or alter it to such a degree, that the fat based confection becomes unworkable. It is also possible that the setting of the fat that occurs during tempering may provide a structure thought to impart heat resistance.

Whether prepared via a premix, or the low boiling point polyol and at least one other thermal structuring component, once prepared, the fat based confection can be handled substantially the same fashion as any conventional fat based composition, and may remain flowable for between several hours and several days. During this time, the fat based confection may be tempered, deposited, molded, enrobed or used as a coating. Once allowed to age and stabilize during a curing period, the fat based composition develops heat resistance as defined herein.

The fat based composition may be a chocolate composition, such as a milk chocolate, a dark chocolate or a white chocolate. As used herein, the phrase "chocolate composition" is meant to indicate a composition that includes one or both of cocoa butter and/or cocoa solids, and is not necessarily limited to any legal definition promulgated by jurisdictions in which this application may be filed and prosecuted.

The fat based confection may be formed into any desired final format. For example, the fat based confection may be molded, enrobed, coated and or sprayed to provide a single serving piece or a multipiece bar or block, any of which may be multitextured or multiregioned, i.e., comprise additional confectionery components in addition to the fat based confection. In those embodiments wherein the fat based confection is used to provide such a multitextured confection, e.g., as by coating, panning spraying or enrobing, the fat based confection may be applied to a core. Any core may be coated, and examples of these include a grain, a nut, ground nut, nut meat, a cookie, a biscuit, caramel, nougat, a marshmallow, a meringue, a dry aerated mass, or combinations of these.

Prior to, during, or after curing and/or stabilization, the fat based confections may also desirably be packaged. Typically, confections may be packaged by forming a film, such as a plastic film, aluminum foil, paper or a combination thereof, into an envelope, which may be substantially tubular, around the confection and sealing the ends of the package which desirably extend beyond the end of the confection.

In some embodiments, the curing period that confers heat resistant can be from about 3 days to about 20 days while in other embodiments, the curing period can be from about 5 days to about 18 days while in still other embodiments, the curing period can be from about 12 days to about 15 days.

In some embodiments, the present heat resistant confections may be packaged in such a way that the heat resistance thereof is further enhanced. And so, packaged fat based confections are also provided. Packaging that reduces sticking of the confection, or reduces heat transfer between the environment and the interior of the packaging can be used for this purpose, and many such packaging platforms are known.

For example, packaging including multiple layers, wherein an internal layer comprises a lubricious material, or wherein the space created by at least two layers is provided with an insulating material or medium, are suitable. Foil may typically be used as the internal layer, closest to the confection, and is advantageous in that its folding properties allow it to tightly wrap around the confection. The inner layer may also be coated, if desired, so that the coating contacts the fat based confection. Or, an additional layer of material may be provided on the inner layer, such as a fat wicking material, so that the fat wicking material contacts the confection. Flow wicking materials include, e.g., parchment.

Flexible laminates, sometimes referred to as flow wrap materials, are typically used as an outer layer in confection packages and the same is suitable for the present heat resistant confections. In some embodiments, one or more layers may be provided intermediate to the foil and flow wrap layers, and in such embodiments, the intermediate layer(s) may desirably provide insulative properties to the package. Insulative materials suitable for use in the package include gases, such as nitrogen, oxygen, argon, or combinations of these. Aesthetic elements may also be included in the packaging, and these include dimples, knurls, undulations, burls, or combinations of these.

The desired package may be formed around the heat resistant confection according to any known method. Typically, a continuous film of the wrapping material, whether single or multi-layered, printed with the desired artwork and/or nutritional information is provided and the heat resistant confection(s) provided thereupon so that the artwork lines up as desired. The film is then wrapped around the confection(s) and sealed in a substantially continuous seam to form a tubular shape. The tube is then cut into parts at the correct locations to provide individual tubular lengths of film containing the desired number of products, which may typically be one. Both ends of each individual tube are then sealed via heat sealing, cold seal adhesive, or twisting. Cutting and sealing may advantageously be performed simultaneously.

Example 1

Premixes according to the formulations shown in Table 1 were prepared as follows. The premix is prepared by mixing the monosaccharide(s) with the polyol(s) and warming the mixture to 50° C. To maintain a smooth and desirable eating texture, the monosaccharide(s) are ground to a particle size of from about 10 microns to about 25 microns prior to mixing with the polyol(s). The mixture can then be held at 50° C. for 60 minutes or stored at ambient temperature for up to 15 hours to create a premix with a semi-solid texture.

Fat based confections were also prepared according to the formulations provided in Table 2, and as follows. Sucrose, cocoa butter and/or other fat along with milk solids (if any) and crumb (if any) are mixed until homogenous. In some instances, the particle size is managed by refining after which the refined mixture is melted and stirred while the emulsifier, flavor, premix (if any), monosaccharide (if any), and polyol (if any) are added prior to molding and solidifying the fat based confection. If a monosaccharide is used, it may be ground to a particle size of from about 10 microns to about 25 microns prior to mixing with the refined mixture.

After solidification, the fat based confection is packaged and allowed to cure. The premix can be any of the premixes in Table 1. The monosaccharide can be dextrose, fructose, galactose, polysaccharides of these, hydrates of these, or combinations of any of these. The polyol can be xylitol, mannitol, sorbitol, glycerin, erythritol, or a combination of these.

Certain of the formulations shown in Table 2 were subjected to rack and tactile testing to determine heat resistance. In rack testing, bars prepared from the formulations are supported on a rack, such as that shown in FIG. 1, by the shortest dimensions thereof, e.g., as shown in FIGS. 2-3 and 9-10. Prepared bars had a thickness of from about 1/16" to about 3/4", or more typically, from 1/8" to about 1/2". In some embodiments, the bars were prepared from formulations not comprising lactose. Generally speaking, bars prepared from premixes, or comprising glycerin in combination with a monosaccharide, e.g., dextrose monohydrate, were supported by the rack for longer periods of time at temperatures of 30° C. or higher, than bars comprising only glycerin. And, heat resistance and stability were enhanced at greater temperatures.

For example, as shown in FIGS. 2A-2D, samples with only the monosaccharide, in some cases, dextrose monohydrate (samples A and D) began deforming at 20 minutes at 38° C. The sample comprising the monosaccharide in combination with glycerin (Sample C) was the last to fall.

Figure 3A:
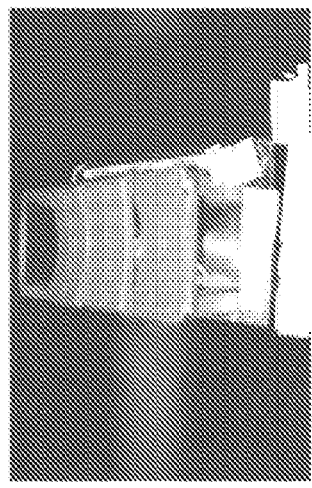
FIG. 3A is a photograph showing the rack testing at 33° C. of a confection comprising a monosaccharide and no glycerin or lactose (sample A); a confection comprising a monosaccharide, glycerin, and no lactose (sample B); a confection comprising a monosaccharide, twice the amount of glycerin as sample B and no lactose (sample C); and a confection comprising a monosaccharide, lactose and no glycerin (sample D) at time 0.
Figure 3B:
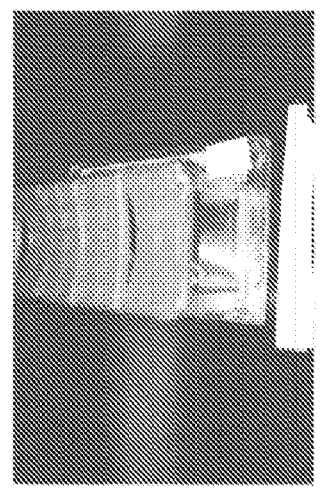
FIG. 3B is a photograph showing the rack testing of the 4 samples shown in FIG. 3A at 2 hours.
Figure 3C:
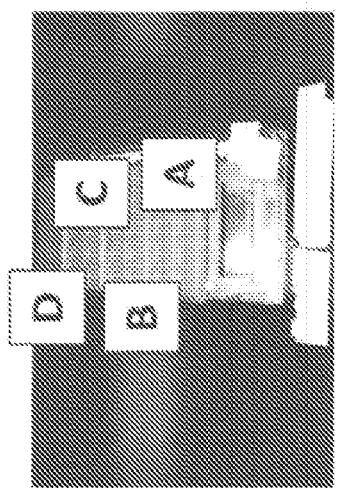
FIG. 3C is a photograph showing the rack testing of the 4 samples shown in FIG. 3A at 2 hours, 15 minutes.
Figure 3D:
FIG. 3D is a photograph showing the rack testing of the 4 samples shown in FIG. 3A at 2 hours, 30 minutes.
Figure 3E:
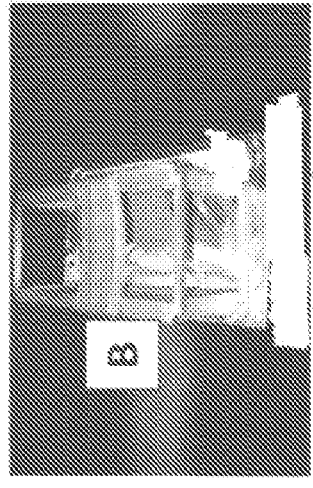
FIG. 3E is a photograph showing the rack testing of the 4 samples shown in FIG. 3A at 5 hours.
Figure 3F:
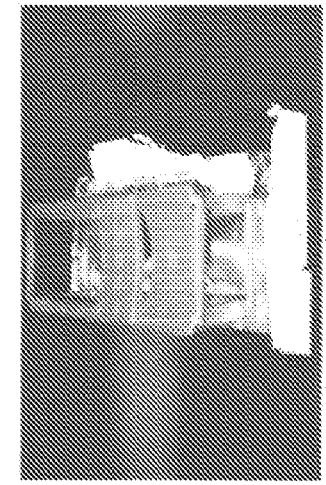
FIG. 3F is a photograph showing the rack testing of the 4 samples shown in FIG. 3A after 72 hours at 33° C.

Photographs of rack testing of the same 4 samples shown in FIGS. 2A-2D at 33° C. are provided in FIGS. 3A-3E. As shown at FIG. 3B, samples with only the monosaccharide (in some cases, dextrose monohydrate) began deforming at 2 hours at 33° C. The sample comprising the monosaccharide in combination with glycerin (Sample B) was the last to fall, after more than 5 hours (FIG. 3E). After 72 hours at 33° C., samples B and C, comprising a monosaccharide and glycerin (sample B having a lesser amount of glycerin than sample C) are both heat stable, even though they split in half and fell of the rack (See, FIG. 3F).

Figure 4A:
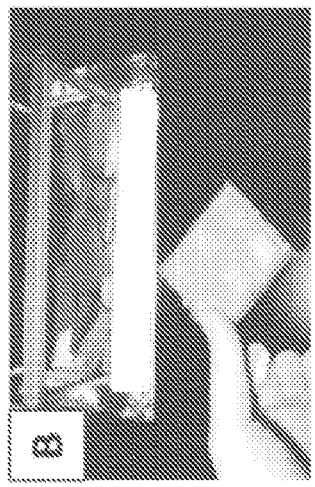
FIG. 4A is a photograph showing the tactile testing of sample A shown in FIG. 3A-3F after 72 hours at 33° C.
Figure 4B:
FIG. 4B is a photograph showing the tactile testing of sample B shown in FIG. 3A-3F after 72 hours at 33° C.
Figure 4C:
FIG. 4C is a photograph showing the tactile testing of sample C shown in FIG. 3A-3F after 72 hours at 33° C.
Figure 4D:
FIG. 4D is a photograph showing the tactile testing of sample D shown in FIG. 3A-3F after 72 hours at 33° C.

Photographs of tactile testing of the samples after 72 hours at 33° C. are shown at FIGS. 4A-4DE. More particularly, as shown in FIGS. 4B and 4C, samples B and C self-support when held at one end by fingertips, i.e., these samples do not slump over. Further, unlike samples A and D (comprising a monosaccharide and no glycerin, shown in Figures A and D), samples B and C do not appear melted and do not appear to the fingers (Figures B and C).

Additional tactile tests were performed on these same samples, without preliminary rack testing. More specifically, samples comprising a monosaccharide, with no glycerin and no lactose (sample A), monosaccharide and glycerin with no lactose (sample B), monosaccharide and glycerin (2 times the amount of sample B) and no lactose (sample C), and monosaccharide with no glycerin (sample D) were subjected to tactile testing after 5-7 days (FIGS. 5A-5F) or 12-15 days (FIGS. 6A-6D) at 38° C.

Figure 5A:
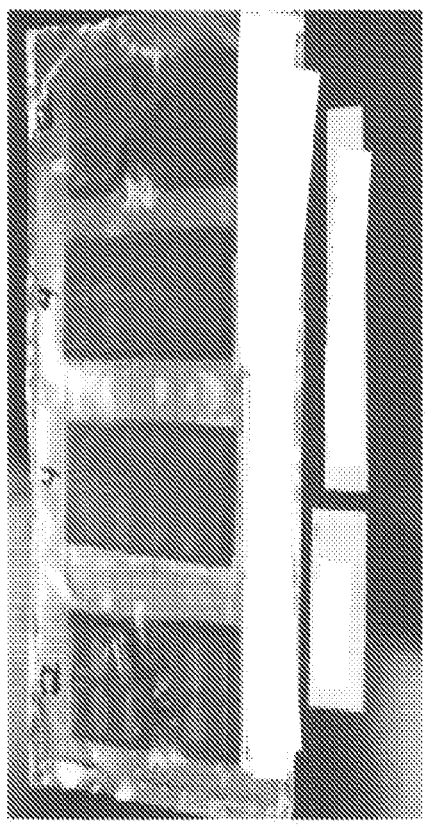
FIG. 5A is a photograph showing a confection comprising a monosaccharide and no glycerin or lactose (sample A); a confection comprising a monosaccharide, glycerin, and no lactose (sample B); a confection comprising a monosaccharide, twice the amount of glycerin as sample B and no lactose (sample C); and a confection comprising a monosaccharide, lactose and no glycerin (sample D) at time 0 at 38° C.
Figure 5B:
FIG. 5B shows the samples shown in FIG. 5A after 30 minutes at 38° C.
Figure 5C:
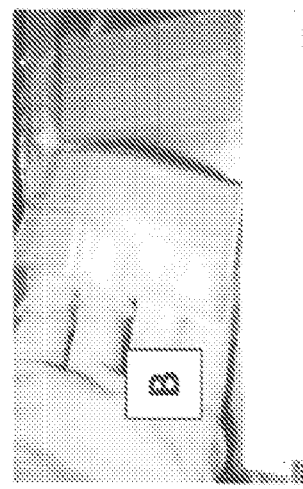
FIG. 5C is a photograph of the tactile testing of sample A after 5 days at 38° C.
Figure 5D:
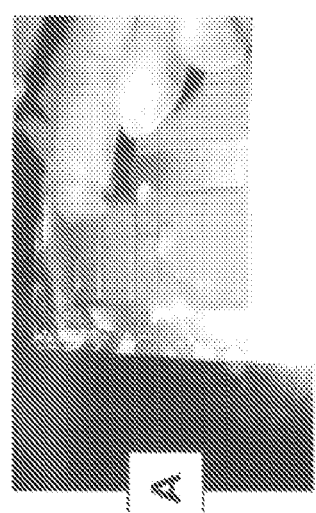
FIG. 5D is a photograph of the tactile testing of sample B after 5 days at 38° C.
Figure 5E:
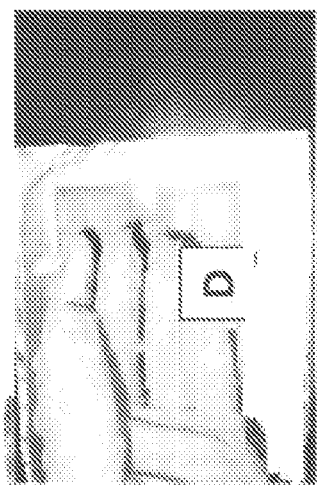
FIG. 5E is a photograph of the tactile testing of sample C after 5 days at 38° C.
Figure 5F:
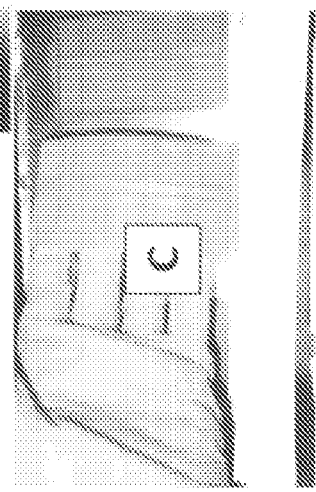
FIG. 5F is a photograph of the tactile testing of sample D after 5 days at 38 C.
Figure 6B:
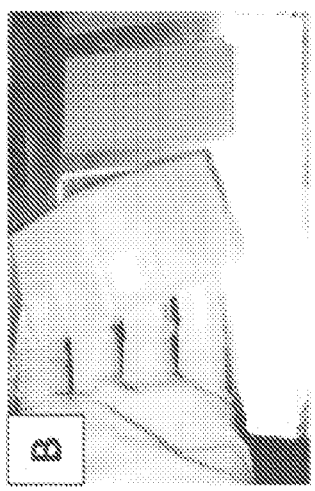
FIG. 6B is a photograph of the tactile testing of sample B (shown in FIG. D) after 12-15 days at 38 C.
Figure 6D:
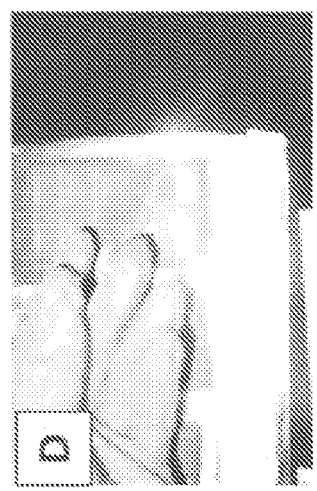
FIG. 6D is a photograph of the tactile testing of sample D (shown in FIG. F) after 12-15 days at 38 C.
Figure 6A:
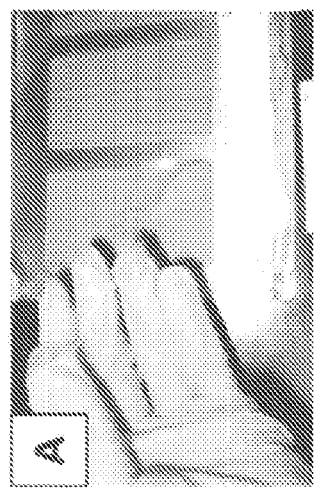
FIG. 6A is a photograph of the tactile testing of sample A (shown in FIG. C) after 12-15 days at 38 C.
Figure 6C:
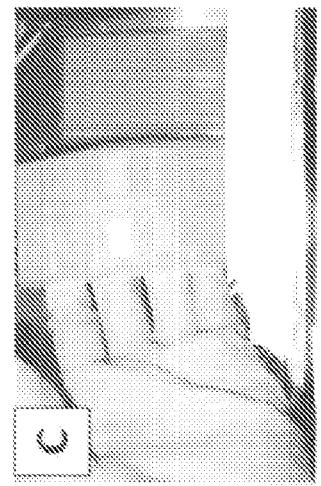
FIG. 6C is a photograph of the tactile testing of sample C (shown in FIG. E) after 12-15 days at 38 C.
Figure 8A:
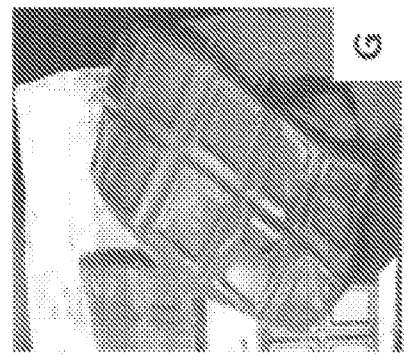
FIG. 8A is a photograph of the tactile testing of sample E after 12-15 days at 38° C.
Figure 8B:
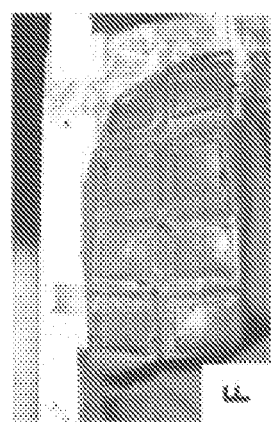
FIG. 8B is a photograph of the tactile testing of sample F after 12-15 days at 38° C.
Figure 8C:
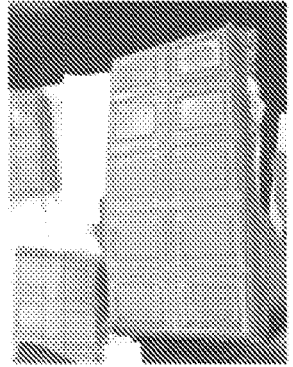
FIG. 8C is a photograph of the tactile testing of sample G after 12-15 days at 38° C.
Figure 8E:
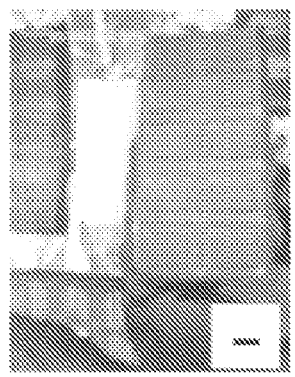
FIG. 8E is a photograph of the tactile testing of sample I after 12-15 days at 38° C.
Figure 8D:
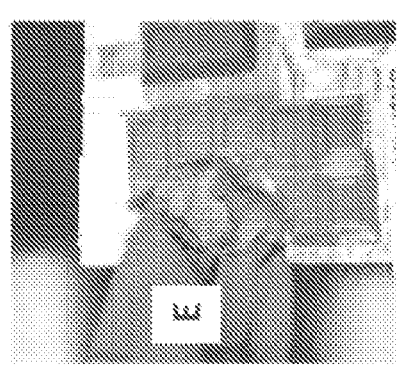
FIG. 8D is a photograph of the tactile testing of sample H after 12-15 days at 38° C.
Figure 8F:
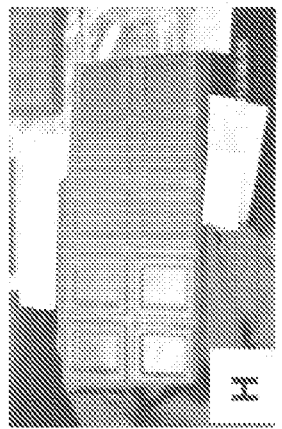
FIG. 8F is a photograph of the tactile testing of sample J after 12-15 days at 38° C.
Figure 9A:
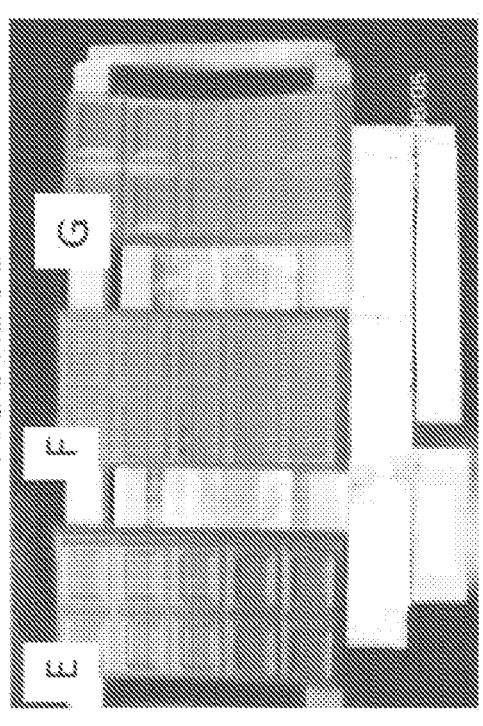
FIG. 9A is a photograph showing the rack testing of samples E-G at 38° C. at time zero.
Figure 9B:
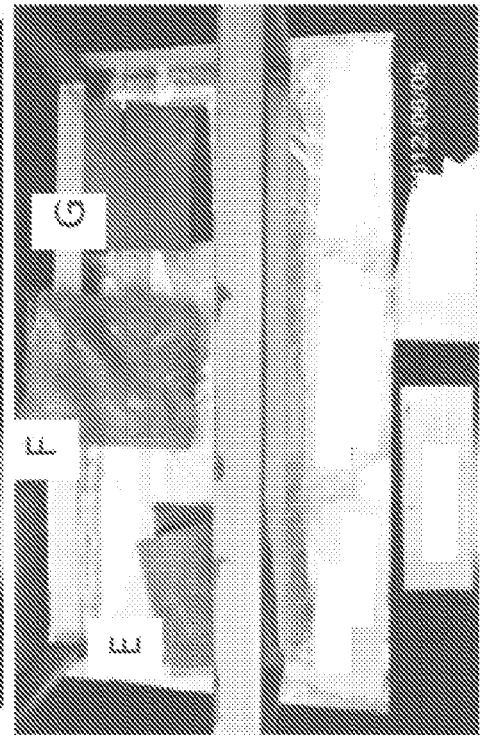
FIG. 9B is a photograph showing the rack testing of samples E-G at 38° C. at 30 minutes.
Figure 9C:
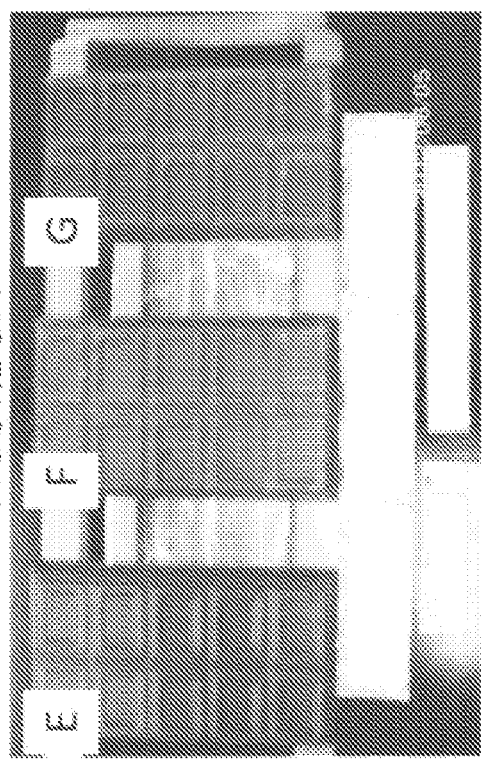
FIG. 9C is a photograph showing the rack testing of samples E-G at 38° C. at 45 minutes.
Figure 9D:
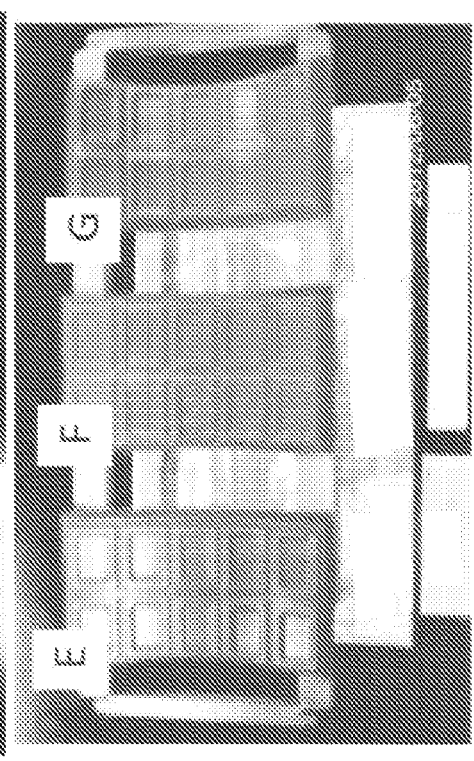
FIG. 9D is a photograph showing the rack testing of samples E-G at 38° C. at 54 minutes.

More specifically, FIG. 5A shows the samples at the initiation of testing, while FIG. 5B is a photograph showing the samples after 30 minutes at 38° C. FIG. 5C is a photograph of the tactile testing of sample A after 5 days. As shown, sample A cannot be lifted and smears when touched, sticking to the fingers. Sample A was thus assigned a tactile score of 2. As shown in FIG. 5D, sample B can be lifted and does not appear melted and was thus assigned a tactile score of 4. As shown in FIG. 5E, sample C can also be lifted and does not appear melted, and was also assigned a tactile score of 4. FIG. 5F shows sample D, which appears melted, cannot be melted, smears when touched, and adheres to the fingers. Sample D was thus assigned a tactile score of 2.

FIG. 6A-6D are photographs of the tactile testing of samples A-D, respectively after 12-15 days at 38° C. As shown, the samples differ only subtly, and the tactile scores awarded after 12-15 days were the same as those awarded after 5-7 days, i.e., samples A and D received a tactile score of 2, and samples B and C received a tactile score of 4.

Additional formulations/embodiments shown in Table 2 were tactile and rack tested with the results shown in FIG. 7-10. More particularly, in FIG. 7-10, confections comprising only glycerin (comparative or prepared via premix, sample E), confections comprising a monosaccharide, glycerin and lactose, wherein the mixture is roll refined to provide a smaller particle size (sample F), confections comprising equal amounts of lactose and a monosaccharide and glycerin (sample G), confections comprising only glycerin (prepared via premix, sample H), confections comprising a monosaccharide, glycerin and lactose, wherein the mixture is roll refined to provide a smaller particle size (sample I), confections comprising equal amounts of lactose and a monosaccharide and glycerin (sample J) are subjected to the rack and tactile testing described above at 38° C. for time periods of between 5-7 days and 12-15 days.

As shown in FIG. 7A-7F, all samples were able to be picked up after 5-7 days at 38° C., with the exception of the sample prepared with only glycerin. The same samples at 12-15 days are shown in FIG. 8A-8F. As shown, all were more stable than at 5-7 days, with samples H-J exhibiting least sticking to the fingers.

Rack testing of samples E-J was conducted at 38 C for time periods of up to 12-15 days. Photographs of the results are provided in FIGS. 9 and 10. As shown in FIG. 9A-9D, sample E fell off the rack at 53 minutes, sample F fell of the rack at 54 minutes, and sample G fell off the rack at 50 minutes. As shown in FIG. 10A-10C, sample H, comprising glycerin alone, fell off the rack after 35 minutes, while samples I-J both fell of the rack at 45 minutes.

Certain of the formulations shown in Table 2, generally comprising glycerin and prepared using a premix, were also packaged and the impact of the packaging on the heat resistance of the confection evaluated. The results of this testing is shown in FIG. 11-12. Generally speaking, the confections packaged in packaging with multiple layers were more stable, and exhibited less sticking to the packaging that those confections packaged in a single layer package.

Figure 11A:
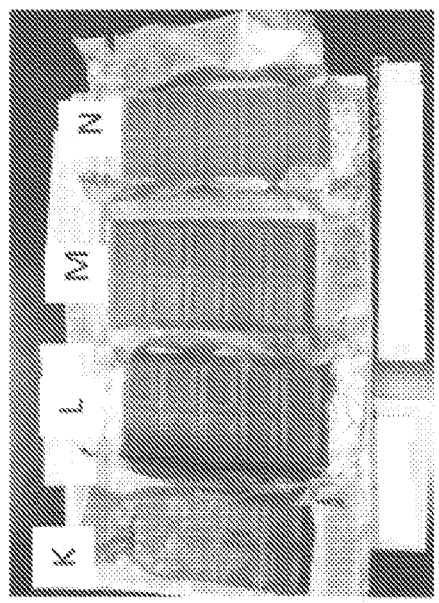
FIG. 11A is a photograph showing, left to right, an unwrapped confection comprising glycerin prepared via a premix (sample K); a confection comprising glycerin, prepared via a premix, and packaged in a multilayer package (sample L); an unwrapped confection comprising glycerin prepared via a premix (sample M); a confection comprising glycerin, prepared via a premix, and packaged in a multilayer package (sample N) after 30 minutes at 38 C.
Figure 11B:
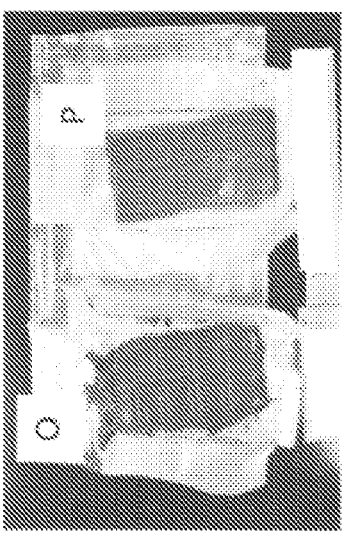
FIG. 11B is a photograph of the same samples shown in FIG. 11A, wherein the packages on samples L and N have been opened.
Figure 12:
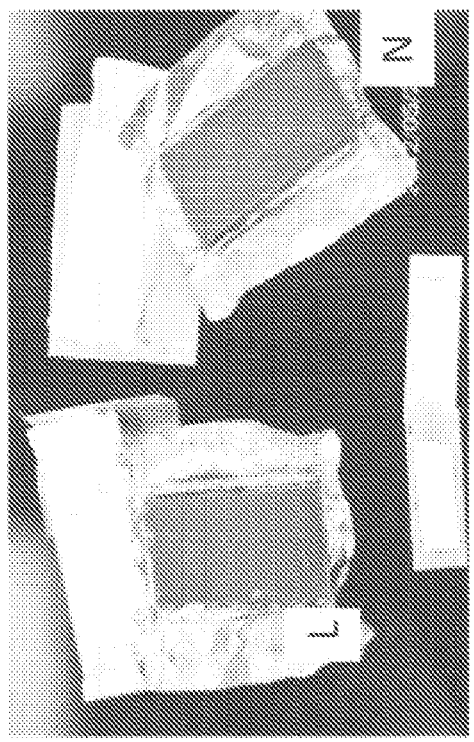
FIG. 12 shows samples L and N after 15 hours at 38° C., when packaged in a multilayer package comprising parchment paper, wherein the packages were opened prior to resolidification of these samples.

More specifically, as shown in FIGS. 11A and 11B, an unwrapped confection comprising glycerin prepared via a premix (sample K); a confection comprising glycerin, prepared via a premix, and packaged in a multilayer package (sample L); an unwrapped confection comprising glycerin prepared via a premix (sample M); a confection comprising glycerin, prepared via a premix, and packaged in a multilayer package (sample N) were subjected to a temperature of 38° C. for 30 minutes.

Figure 11C:
FIG. 11C is a photograph showing two conventional confections (samples O and P) packaged in a single layer package, after 30 minutes at 38° C. with their packages opened.

As shown, fat based confections packaged in a multilayer package comprising foil as an inner layer and an outer layer of flow wrap, i.e., a flexible laminate, (samples L and N) retained their shape better than unwrapped confections of the same formulation (samples K and M), and did not exhibit sticking to the package after 30 minutes at 38° C. As shown in FIG. 11C, conventional confection formulations not comprising glycerin or prepared via a premix and packaged in a single layer package were deformed after 30 minutes at 38° C. and exhibited substantial sticking to the package (samples O and P).

FIG. 12 shows samples L and N after 15 hours at 38° C., when packaged in a multilayer package comprising parchment paper, wherein the packages were opened prior to resolidification of these samples. As shown, the added parchment layer provided additional robustness to the heat resistance exhibited by these samples.

TABLE 1

Premix Formulations
Example Number, w/w %

| Ingredient | 1 | 2 | 3 | 4 | 5 | 6 | 7 | 8 | 9 | 10 | 11 | 12 |
|---|---|---|---|---|---|---|---|---|---|---|---|---|
| Sucrose | 45-55 | | | | | | | | | | | |
| Anhydrous Dextrose | | | | | | | | | | 5-15 | | |
| Dextrose Monohydrate | | | 20-30 | | 45-55 | 45-55 | 35-45 | 35-45 | 25-35 | | | |
| Lactose | | 45-55 | 20-30 | 45-55 | | | | | | | | |
| Fructose | | | | | | | | | | 30-40 | | |
| Galactose | | | | | | | | | | | 50-60 | |
| Sorbitol | | 45-55 | | | 45-55 | | 25-35 | | | | | |
| Glycerin | 45-55 | | 45-55 | 45-55 | | 45-55 | 25-35 | 55-65 | 55-65 | | | 45-55 |
| Xylitol | | | | | | | | | | 70-80 | | |
| Mannitol | | | | | | | | | | | 40-50 | |
| Erythritol | | | | | | | | | | | | 45-55 |

TABLE 2

Fat Based Confectionery Formulations
Example Number, w/w %'s

| Ingredient | 13 | 14 | 15 | 16 | 17 | 18 |
|---|---|---|---|---|---|---|
| Sucrose | 45-50 | 45-50 | 45-50 | 45-50 | | |
| Cocoa Butter | 18-22 | 8-12 | 18-22 | 8-12 | 15-20 | 15-20 |
| Fat | | | | | | |
| Milk Solids | 18-22 | | | 18-22 | | |
| Cocoa liquor | 10-13 | 35-45 | 10-13 | 35-45 | 10-15 | 10-15 |
| Crumb | | | | | 50-80 | 50-80 |
| Emulsifier | 0.2-1.2 | 0.2-1.2 | 0.2-1.2 | 0.2-1.2 | 0.2-1.2 | 0.2-1.2 |
| Flavor | 0.02-0.1 | 0.02-0.1 | 0.02-0.1 | 0.02-0.1 | 0.02-0.1 | 0.02-0.1 |
| Premix | 1-2.5 | 1-2.5 | | | 1-2.5 | |
| Monosaccharide | | | 0.5-1.25 | 0.5-1.25 | | 0.5-1.25 |
| Polyol | | | 0.5-1.25 | 0.5-1.25 | | 0.5-1.25 |

| Ingredient | 19 | 20 | 21 | 22 | 23 | 23 |
|---|---|---|---|---|---|---|
| Sucrose | 40-50 | 40-50 | 45-50 | 45-50 | | |
| Cocoa Butter | | | | | | |
| Fat | 40-50 | 40-50 | 18-22 | 8-12 | 15-20 | 15-20 |
| Milk Solids | 45-55 | 45-55 | 18-22 | | | |
| Cocoa liquor | | | 10-13 | 35-45 | 10-15 | 10-15 |
| Crumb | | | | | 50-80 | 50-80 |
| Emulsifier | 0.2-1.2 | 0.2-1.2 | 0.2-1.2 | 0.2-1.2 | 0.2-1.2 | 0.2-1.2 |
| Flavor | 0.02-0.1 | 0.02-0.1 | 0.02-0.1 | 0.02-0.1 | 0.02-0.1 | 0.02-0.1 |
| Premix | 1-2.5 | | | 1-2.5 | 1-2.5 | |
| Monosaccharide | | 0.5-1.25 | 0.5-1.25 | | | 0.5-1.25 |
| Polyol | | 0.5-1.25 | 0.5-1.25 | | | 0.5-1.25 |

Example 2

Impact of Addition of Glycerol to Crumb on Rheological Properties and Melt Resistance of Chocolate Produced Therefrom Glycerol in the finished chocolate is tested using a glycerol food analysis test kit and which detected 0% glycerol in the control, 0.8 wt % in the 1 wt % sample and 1.6 wt % in the 2 wt % sample.

Viscosity and yield of the finished chocolates are measured and the results are provided in Table 3:

TABLE 3

| Sample | Viscosity (poise) | Yield (poise) |
|---|---|---|
| Control (0% glycerol in crumb) | 28.4 | 24.5 |
| 1 wt % glycerol added to crumb | 21.3 | 24 |
| 2 wt % glycerol added to crumb | 25.3 | 26.2 |

Finished chocolate was prepared according to a conventional formulation, using the prepared crumbs. The particle size of the chocolate is reduced using a refiner to give a particle size of 20 μm. The finished chocolate is formed into tablets (15 g).

Melt resistance is measured by dividing the tablets into groups and placing the groups on supported wax paper. The tablets are then stored at 35 C for 1 hour. After storage, the tablets are shaken on a vibrating table oscillating at a frequency of 600 Hz for ml minute. The tablets are immediately cooled, removed from the wax paper, and transferred to graph paper. The area covered by each tablet is measured. The melt resistance is reported as the area of each tablet before vibration minus the area of each tablet after vibration, and so, a value of 0 indicates no lost area and total melt resistance, with increasing numbers indicating increased material lost and less melt resistance.

The conventional chocolate had a melt resistance of 6.8, while the 0.8 wt % glycerol sample had a melt resistance of 4.0, and the 1.6 wt % glycerol sample had a melt resistance of 3.0 And so, this example shows that the addition of greater amounts of glycerol results in increasing melt resistance. Also, the addition of glycerol to the crumb did not result in an increase in yield or viscosity, as it is known to do when added to finished chocolate.

Example 3

A batch of crumb is produced according to the formula shown in Table 4.

TABLE 4

| Ingredient | Wt. % |
|---|---|
| Sugar | 54.63 |
| Skim Milk Powder (SMP) | 17.26 |
| Cocoa Liquor | 13.80 |
| Lactose | 5.82 |
| Water | 6.49 |
| Glycerol | 2.00 |

Specifically, the sugar, SMP, cocoa liquor, and lactose are added to the hopper of an extruder. The glycerol and water are mixed and added to the extruder via a water port, and the crumb extruded.

The crumb is then used to prepare a chocolate according to the formula shown in Table 5.

TABLE 5

| Ingredient | Wt. % |
|---|---|
| Crumb | 77.33 |
| Cocoa butter | 16.1 |
| Anydrous Milk Fat (AMF) | 5.92 |
| Lecithin | 0.65 |

A conventional chocolate is prepared using the same formulas and methodology, but with 8.49% water in the crumb, rather than 6.49% water and 2 wt % glycerol.

It is observed that, after 20 hours of conching time, the conventional chocolate contains a large number of small unmilled pieces of chocolate. The inventive chocolate, having glycerin mixed with the crumb prior to preparation of the complete chocolate, is almost completely lump free and of acceptable particle size after less than 16 hours conching time. Characteristics of the conventional and inventive chocolate after conching are shown in Table 6.

TABLE 6

| Sample | Particle size (μ) | Yield (Pa) | Viscosity (Pa) |
|---|---|---|---|
| Conventional (no glycerin in crumb) | 18 | 37.7 | 7.1 |
| Inventive (2% glycerol in crumb) | 12 | 37.7 | 7.1 |

The conventional and inventive chocolate are used to coat centers. More specifically, the centers are either wholly coated using the inventive chocolate, or coated using the conventional chocolate, having mixed therein 1.5% glycerin during coating, i.e., the glycerin is mixed with the chocolate through a static mixer located immediately prior to the chocolate spray nozzle. The coating process for both proceeds as follows:

250 kg centers are measured and transferred to a coating drum. The drum rotates at 0.95 rpm during loading to distribute the centers. With the drum at keying speed (3.5 rpm) centers are sprayed with 400 kg chocolate (50° C.) at the rate of 13 kg chocolate per minute. Chocolate usage is measured using load cells. Cooling air (6° C.) is activated after 50 kg of chocolate has been sprayed. The air is turned off and drum accelerated to 7.0 rpm and another 150 kg of chocolate sprayed onto the centers. The chocolate spray is then stopped and the centers allowed to roll until dry. The coated centers are then chilled with air for a few minutes. This cycle of coating-rolling-chilling is repeated several times using 20 kg of chocolate at a time to build up the chocolate coating in smooth layers. Once all the chocolate is added, the coated centers are chilled for 30 minutes to harden them. The coating cycle takes approximately 90 minutes per batch. The batch is then polished and stored until packaged.

Melt resistance of the control and inventive samples is measured by supporting 10 coated centers individually and then heating them to 35° C. for one hour followed by vibration for one minute. The amount of chocolate which dropped off the 10 coated centers was then measured in grams. The results of these measurements, wherein a measurement of 0 indicates full melt resistance and a value of 5 or more indicates little or no melt resistance, are shown in Table 7.

TABLE 7

| Sample | Melt Resistance 1 week | Melt Resistance 4 weeks |
|---|---|---|
| Conventional Chocolate (no glycerin added) | >7 | 5.43 |
| Conventional Chocolate (glycerin added to complete chocolate just before spraying) | 0 | 0 |
| Inventive (2% glycerin added to hydrated crumb) | 0 | 0 |

As shown, both the inventive and conventional chocolate having glycerin added to complete chocolate just prior to spraying exhibit excellent melt resistance, rheological properties of the inventive chocolate are much more amenable to coating than those of the conventional chocolate, at least because the addition of glycerin immediately prior to spraying is expected to increase the viscosity of the conventional chocolate dramatically.

The invention claimed is:

1. A packaged fat based confection comprising:
a premix that comprises a thermal structuring component, wherein the thermal structuring component consists of glycerol and dextrose monohydrate, wherein the glycerol comprises between 0.5 wt % and 1.625 wt % of the fat based confection and the dextrose monohydrate comprises between 0.5 wt % and 1.25 wt % of the fat based confection, wherein the premix is prepared by mixing the glycerol and the dextrose monohydrate and holding the mixed glycerol and dextrose monohydrate at a temperature of 50° C. for at least 60 minutes,
wherein the fat based confection is packaged in a flexible multilayer package comprising a fat wicking layer that contacts the fat based confection, and wherein the fat based confection is a chocolate that is heat resistant as determined by tactile testing after exposing the chocolate at 38° C. for 15 hours.

2. The packaged fat based confection of claim 1, wherein the multilayer package comprises two layers comprising an inner layer and an additional layer inside of the inner layer, wherein the fat wicking layer is the additional layer.

3. The packaged fat based confection of claim 2, wherein the inner layer of the package comprises foil.

4. The packaged fat based confection of claim 2, wherein the package further comprises an outer layer comprising a flow wrap material.

5. The packaged fat based confection of claim 1, wherein the fat wicking layer comprises a parchment paper.

6. The packaged fat based confection of claim 1, wherein the glycerol comprises between 0.5 wt % and 1.25 wt % of the fat based confection.

7. The packaged fat based confection of claim 1, wherein the fat based confection is configured as a multipiece bar or block in which one or more of the pieces comprises an additional confectionery component as a core over which the fat based confection is coated.

8. The packaged fat based confection of claim 7, wherein the core comprises a grain, a nut, a ground nut, a nut meat, a cookie, a biscuit, caramel, nougat, marshmallow, meringue, a dry aerated mass, or any combination thereof.

9. A fat based confection comprising:
a premix that comprises a fat and a thermal structuring component, wherein the thermal structuring component consists of glycerol and dextrose monohydrate, wherein the glycerol comprises between 0.5 wt % and 1.625 wt % of the fat based composition and the dextrose monohydrate comprises between 0.5 wt % and 1.25 wt % of the fat based confection, wherein the premix is prepared by mixing the fat, the glycerol, and the dextrose monohydrate,
wherein the confection is packaged in a flexible multilayer package that comprises a fat wicking layer that contacts the fat based confection, and wherein the fat based confection comprises a chocolate that is heat resistant as determined by tactile testing after exposing the chocolate at 38° C. for 15 hours.

10. The packaged fat based confection of claim 9, wherein the multilayer package comprises a foil layer.

11. The packaged fat based confection of claim 9, wherein the fat wicking layer comprises parchment paper.

12. The packaged fat based confection of claim 9, wherein the package further comprises a flow wrap material.

13. The packaged fat based confection of claim 9, wherein the glycerol comprises between 0.5 wt % and 1.25 wt % of the fat based confection.

14. The fat based confection of claim 9, wherein the heat-resistant chocolate is further heat stabilized with a method comprising the step of tightly wrapping the fat based confection with the flexible multilayer package comprising the fat wicking layer and a foil layer.

15. The fat based confection of claim 9, wherein the fat based confection is configured as a multipiece bar or block in which one or more of the pieces comprises an additional confectionery component as a core over which the fat based confection is coated.

16. The fat based confection of claim 15, wherein the core comprises a grain, a nut, a ground nut, a nut meat, a cookie, a biscuit, caramel, nougat, marshmallow, meringue, a dry aerated mass, or any combination thereof.

* * * * *